(12) United States Patent
Trottier et al.

(10) Patent No.: US 11,445,704 B1
(45) Date of Patent: Sep. 20, 2022

(54) SOUND BUTTON DEVICE

(71) Applicant: CLEVERPET, INC, San Diego, CA (US)

(72) Inventors: Leo Trottier, San Diego, CA (US); Jelmer Tiete, Alameda, CA (US); Gary Stephen Shuster, Vancouver (CA); Chen Hai Yu, Dalang (CN)

( * ) Notice: Subject to any disclaimer, the term of this patent is extended or adjusted under 35 U.S.C. 154(b) by 0 days.

(21) Appl. No.: 17/667,461

(22) Filed: Feb. 8, 2022

Related U.S. Application Data

(60) Provisional application No. 63/228,578, filed on Aug. 2, 2021.

(51) Int. Cl.
*A01K 15/02* (2006.01)

(52) U.S. Cl.
CPC ............................... *A01K 15/021* (2013.01)

(58) Field of Classification Search
CPC ............ A01K 15/021; G10H 1/32; G10H 1/34
See application file for complete search history.

(56) References Cited

U.S. PATENT DOCUMENTS

| | | | | |
|---|---|---|---|---|
| 5,604,478 A * | 2/1997 | Grady | ...................... | G08B 3/10 340/286.11 |
| 6,094,139 A * | 7/2000 | Moore | ................... | A01K 1/035 340/286.11 |
| 6,743,971 B1 * | 6/2004 | Chen | ....................... | G10H 1/32 84/746 |
| 6,910,447 B1 * | 6/2005 | Azarian | ............... | A01K 15/021 379/159 |
| 7,057,515 B2 * | 6/2006 | Smith | .................... | A01K 15/02 340/573.3 |
| 7,439,463 B2 * | 10/2008 | Brenner | ............... | A61C 1/0023 433/101 |
| 10,334,823 B2 * | 7/2019 | Foster | ................... | A01K 15/021 |
| 2007/0295283 A1 * | 12/2007 | Gick | .................... | A01K 15/021 119/707 |
| 2009/0123901 A1 * | 5/2009 | Hunt | ...................... | G09B 19/00 434/319 |
| 2012/0312247 A1 * | 12/2012 | Ebersole | ................ | A01K 15/02 340/573.3 |
| 2015/0133023 A1 * | 5/2015 | Lewis | .................... | A63H 33/26 446/91 |

(Continued)

FOREIGN PATENT DOCUMENTS

| | | | | |
|---|---|---|---|---|
| WO | WO-2008148381 A1 * | 12/2008 | ............. | A01K 15/02 |
| WO | WO-2014134606 A1 * | 9/2014 | ........... | A01K 15/021 |

*Primary Examiner* — Kurt Fernstrom
(74) *Attorney, Agent, or Firm* — Coleman & Horowitt LLP; Sherrie M. Flynn

(57) ABSTRACT

A sound button devices, systems, and methods for sound buttons capable of emitting sound using less power, greater sound transmissibility, and/or greater resistance to damage and that allow for training both non-humans and humans to communicate more effectively than previously possible In typical embodiments, the sound button may comprise a shell, a switch operably connected to a printed circuit board ("PCB"), a button cap assembly operably coupled to the shell, the button cap assembly comprising a button cap having at least one recess, the at least one recess having a hole; and a speaker facing toward the button cap, where, when a force is applied to the button cap, the button cap and the speaker move together to actuate the switch, thereby causing the speaker to emit a sound.

20 Claims, 21 Drawing Sheets

(56) References Cited

U.S. PATENT DOCUMENTS

2016/0366859 A1* 12/2016 Prasanna ................. H04W 4/14
2017/0079242 A1*  3/2017 Mosley ................... G06F 3/165
2018/0132453 A1*  5/2018 Foster ................... A01K 15/021

* cited by examiner (Sect. A-A)

(Sect. B-B)

(Sect. C-C)

(Enlarged View D)

(Enlarged View E)

(Enlarged View F)

(Enlarged View G)

SOUND BUTTON DEVICE

CROSS REFERENCE TO RELATED APPLICATION

This application claims priority pursuant to 35 U.S.C. § 119(e) to U.S. Provisional Application No. 63/228,578, filed Aug. 2, 2021, all of which is incorporated herein by reference in its entirety.

FIELD OF THE INVENTION

The present disclosure relates to sound generating devices, systems and methods, including sound generating devices for animal communication and for use in wet and/or rough environments.

INTRODUCTION

Devices having a circuit that when actuated drives a speaker to make a sound frequently see a trade-off between ruggedness and functionality. For purposes of this application, the term "Sound Button" references this category of devices (although they need not be shaped like a button or bear a physical actuation switch).

The introduction of animal training Sound Buttons underscores the importance of eliminating this trade-off. Animals can be messy, can drop, drool or bite things, can drag muddy or wet substances to buttons, and generally present an environment that is hostile to exposed electronics. At the same time, the importance of transmitting a clear sound is heightened in the case of training devices.

For example, and as described in U.S. provisional patent application 63/228,578 (the contents of which are hereby incorporated by reference as if fully set forth), sound can be used to synchronize or otherwise communicate between a plurality of Sound Buttons, making any degradation in sound a potential point of failure. Similarly, the fidelity of sounds is important. Dogs are more easily trained if (a) each button generates a similar sound quality, (b) the buttons produce a loud, high quality sound that the dog recognizes as the voice of the owner, (c) the buttons do not change sound quality significantly and/or rapidly, (d) the buttons do not develop any sound artifacts that might render the sounds more difficult to understand and/or painful or uncomfortable to hear, and (e) the buttons produce a loud, high quality sound such that the dog recognizes the word, phrase, or other sound it produces. We use "dogs" as an example case here, but unless the context clearly indicates otherwise, the inventions also apply to use by other animals (e.g., cats, rabbits, ferrets, pigs, etc.).

Dogs and other animals naturally attempt to communicate, including communication across species. For example, a dog that needs to empty its bladder may scratch on the front door and a cat that is hungry may vocalize near the food bowl. Indeed, there have been some examples—such as Nim Chimpsky and Koko the gorilla—where animals learned to use a broad range of concepts in communication with humans. In many cases, a gating factor to improved human-animal communication (and indeed in human-human communication) is lack of a shared language. For animals without the capacity to speak, a primary gating factor is the lack of a communications modality that the other species (usually humans) understand and can use. In many cases, very young children and humans with communication disorders or limitations may also be included in the term.

Existing methods for animal/human communication tends to rely on humans teaching the dog human communications modalities. Dogs are trained to hear and understand simple words, such as "sit". Dogs are trained to respond to stimuli in a manner that humans prescribe—such as when a drug sniffing dog "alerts" to a smell by acting out the behavior that it was taught to engage in when it smells drugs. Dogs do attempt to fill in the gaps by devising their own communications modalities, such as barking to get attention, scratching on a door, etc. However, more often than not these efforts are discouraged because humans do not appreciate the importance of the dog's effort to communicate (and because in some cases the dog's efforts can annoy humans or damage property).

Thus, a strong need exists for a sound button capable of operating in adverse conditions without sacrificing the sound quality, speaker and/or other components.

BACKGROUND

Prior art solutions have fully enclosed the sound generating apparatus, including the speaker, the integrated circuit and/or printed circuit board ("PCB") to avoid damage from liquids or other contaminants. Another prior art iteration is to simply expose the speaker to avoid sound degradation by an enclosure, accepting the risk of sound degradation by damage and/or liquid.

Buttons that may be actuated by dogs are known in the art, such as that found in FIG. 18d of Anderson et al., U.S. Pat. No. 8,944,006. The Anderson button is dome-shaped with a flat bottom and appears to be fully enclosed.

In Chih-Hsien Wu, U.S. Pat. No. 7,786,875, a dog-worn device is presented, capable of actuating a speaker. The Chih-Hsien Wu art apparently is a liquid-vulnerable device capable of being covered by a waterproof seal. Such a seal would obviously interfere with any sound emitted from behind the seal.

McKinney, U.S. Publication No. 20120097113A1 describes a pet toy where a speaker is actuated by squeezing and/or manipulating the toy. It appears that McKinney does not address the issues of sound quality or vulnerability to adverse conditions.

Dogs are thought to have developed their relationship with humans approximately 14,000 to 30,000 years ago. It is not yet certain how they came to develop their symbiotic relationship, but a current popular hypothesis is that dogs "self-domesticated" by spending time eating scraps, garbage, and carcasses discarded by humans. Humans would have quickly killed aggressive dogs, while the nicer and most useful (or those with traits such as large eyes that are associated with human caring) would have managed to successfully win over human hearts, perhaps first acting as a kind of warning system. Since then, of course, dogs' roles in human life have significantly expanded to the point where many now regard dogs as "part of the family."

Just several hundreds of years ago, it was common for women to have children while teenagers. In the past several centuries, nearly all women who bore children would have had children not later than their early or mid-20's. However, today, as people postpone marriage and child-rearing, the urge many individuals and couples experience to have something to care for is not being met. Instead of babies, many are turning to pets, and in particular dogs. Furthermore, as human life expectancy has grown, the desire for a baby substitute is appealing to "empty nesters". The "cuteness" babies exhibit, and humans perceive, is an evolutionary adaptation that compels human care-giving, and it is very likely this same trait that dogs (especially puppies and kittens) exploit.

As proto-babies, then, dogs elicit from their care-givers many of the same caring behaviors. In particular, one care-giver impulse is the normally-frustrated desire for higher bandwidth communication. The need for better understanding and to "get inside their head." This is evidenced in part by the frequent use of high-pitched "baby talk" in speaking with dogs. "Baby talk", also known as infant-directed speech, and formerly called "motherese," is a form of speech production that has been found to speed language learning through the use of phonetic and intonational exaggeration. However, it is worth noting that language development in humans can, and often does, include adult adoption of terms created by a child. For example, a child may have trouble pronouncing "grandma" and simply say "meme" instead. Because the adult knows—or quickly figures out—that meme is the child's term for "grandma", it is common for the adult to allow the child to use that term and even for the adult to use that term around the child.

The utility of dogs in improving the mental health of those in isolation, such as prisoners or hospital patients, has long been a subject of research. However, the COVID-19 pandemic and associated restrictions has underscored the critical role that dogs play in assisting those in isolation—or even those simply living alone. In recognition of the importance of pets to human happiness and mental health, some jurisdictions, such as Vancouver, Canada, have adopted motions supporting a public policy prohibiting "no pets" clauses in leases. As pets come to play a more central and crucial role in human wellbeing and mental health, it is critical that interspecies communication modalities be developed exceeding what is made possible by existing technology.

Dogs, for their part, are famously social animals who hunt, travel, and live in packs. A successful pack requires some amount of communication among its members, and since packs are social constructs, and/or to the extent they are hierarchical, an understanding of social situations is highly evolutionarily adaptive to the pack's members. This understanding of the organization of groups of individuals is likely what led to dogs becoming useful as aids to human shepherds. After humans and dogs began to co-evolve, dogs gradually became bred for their ability to herd and protect, as well as how to learn and follow commands. The extent of differences in dog morphology (size and shape) is a testament to the speed and productivity of selective breeding for physical attributes—it stands to reason that similar magnitude effects would have found themselves manifested in the evolution of the dog's cognitive and behavioral attributes.

Most dogs today exist as pets and act as human companions. Indeed, most households regard dogs as "members of the family". As family members, and as "proto-babies" partaking in many family activities, many households have a keen interest in having better communication with their dog. Currently, this need is only partially met through the hiring of dog trainers and through learning of dog training techniques. Such training techniques are widely considered varieties of learning/training by classical and operant conditioning. In the case of classical conditioning, learning is a kind of prediction: a bell's ring is associated with food for a dog, and food is associated with mucus production in that dog, and thus a bell's ringing can "cause" mucus production in the same dog. In the case of operant conditioning, a dog performs a behavior and receives either positive or negative feedback for having done so, causing a corresponding increase or decrease in the future performance of the behavior.

To date, dog conditioning has been done from the perspective of the human. That is, communication tends to be on human terms and about the things that humans find important. Police dogs, drug dogs, cancer-detecting dogs, rescue dogs and other dog "jobs" serve humans. However, there is a need for dog-centered communication. For example, a dog may feel ill but be unable to tell the human that it is sick, much less what part of their body feels sick. As a result, a dog with a stomach bug may defecate in the house and be punished, all for want of a way to tell its human "my stomach hurts, help". Even communications that appear dog-centered, such as a dog scratching on a door to ask to go on a walk, serves a dual purpose in alerting humans to the need for the dog to void. Most humans have inherent caring characteristics yet are unable to learn from the dog how the dog needs to be cared for.

Of course, most dog behaviors are not a direct result of deliberate classical or operant conditioning. Stories abound of dogs learning words and social conventions within the home entirely incidentally, absent any intentional training. Like all animals, dogs are sensitive to the rich environmental context of their behaviors and the environmental consequences of their behaviors. As such, they can learn novel and clever behaviors in the absence of a punishment or a food reward, be it repeatedly tossing a ball down a set of stairs, lifting a latch to escape from a cage, or coming to the aid of a person in distress.

Were humans exclusively trained through direct operant conditioning, it is unlikely that a human would be able to write this sentence. There are relatively few "human obedience schools" because the existence of language has enabled the kind of rich communication that both obviates and provides alternatives to the kinds of acting out that infants might perform. Both unhappy dogs and infants will act out to get attention, the unwanted behavior often persisting until attention is gotten, or the problem has resolved.

Thus, providing dogs with the ability to understand and express words is likely to have benefits not just of novelty, but also to the wellbeing of dogs and people alike. The trust that higher bandwidth communication engenders is a universal factor in preventing unwanted behavior. Individuals in richer communication with each other are better able to predict each other's reaction, which serves to both prevent unwanted behaviors and help select more prosocial ones. For instance, dogs able to express that they need to urinate are much less likely to do so in a location where they're not allowed to, like indoors. One particular need is disambiguation of meaning. Without a common language, such as that proposed by embodiments of the inventions herein, a dog may develop a signaling system that presents as ambiguous for humans. In a simple example, a dog may sit at the feet of a human and stare when the dog is hungry and when the dog needs to be walked.

Taking another example, dogs bark for a variety of reasons. Excitement, a call for attention, food-seeking, boredom, fear, anxiety, territoriality, pain, surprise, reaction to unexpected stimuli, dementia, warning, and other reasons can cause a dog to bark. Although the dog's body language and the characteristics of the bark sound may provide a clue as to the reason for the bark, it is frustrating for humans— and likely for dogs—that humans normally do not understand which of these reasons has triggered the barking. Indeed, it is likely that communications between dogs are supplemented by signals that humans do not perceive. For example, a dog's superior senses of hearing and smell may provide the context for other dogs to determine whether another dog's bark is in response to a distant, quiet barking sound or in response to the nearby presence of an unknown human as indicated in part by the presence of the scent of that human.

By allowing dogs to be more precise and/or specific in their communication, the bark may be characterized by the dog. For example, a bark accompanied by a button press for "play" may indicate boredom; accompanied by "danger" may mean warning; accompanied by "treat" may mean hunger, etc. In one aspect, a bark may be detected by an audio detection device operably coupled to a network that is also operatively coupled to at least one button. Certain combinations —such as a bark combined with "warning"- may trigger a signal to a device capable of communicating to a human, such as a portable phone. In some cases it may be that the availability of the button may mean a loud and disruptive bark may no longer be required.

Because of these benefits, the market for a device, system, and method for rich communication with dogs is likely of value in nearly every household (or business, community or similar construct) that has a dog. If puppies can be taught to understand and express their needs, wants, feelings, and thoughts, and this leads to richer interactions with other species, the impact will be hard to overstate. Advanced communication with dogs will improve and enable better participation of working dogs in the economy, enabling them to be trained more quickly and perform their tasks more precisely. For example, dogs already make excellent aids in a security context, in helping with patrols. With rudimentary language abilities, dogs could potentially even replace humans in this role or at least operate with a higher ratio of dogs to human handlers. They will also be in a better position to entertain themselves when left by themselves at home, enabling them to be more independent and less anxious in this context. Just as a dog might play with a ball even though there is nobody present to throw it, so too might the dog play with language as expressed via the inventions. They will also be able to provide richer and more meaningful companionship to billions of people entering old-age, potentially helping alleviate the current crisis of loneliness, and perhaps even to transform old-age facilities as they're currently understood.

Protection and service dogs cost tens of thousands of dollars to train: word-based communication, however, would potentially mean a significant reduction in training time and thus, potentially, costs. Since we know dogs can detect such things as the early signs of cancer, Parkinson's, Alzheimer's, and seizures, word-based communication could result in major medical advances. Similarly, dogs and many other animals can detect an impending natural event in advance of the event taking place. Using earthquakes as an example, it is thought that animals can detect primary waves, or "P-waves", earthquake waves that precede the dangerous later waves.

It is important to note that the range of canine to human communication methods normally available is very limited. For example, and as discussed above, a dog might bark out of excitement, boredom, in response to auditory stimuli, in response to an intruder, to simply alert humans to something happening, or for other reasons. Without the ability to further clarify, however, the human is left wondering what the dog is feeling or trying to convey. This is like a dog scratching at the door to the outside. The dog might need to urinate or defecate; the dog may be bored; the dog may want to go outdoors; or the dog might want to visit somebody. Again, with such a blunt communications tool, the human is left wondering what the dog wants. By allowing the dog to further refine the expression, such as a bark accompanied by pressing the button for "scared", the dog can refine the communication. Furthermore, by allowing such refinement, the dog's press of a button may be used to trigger real world responses. For example, pressing the "scared" button might send a signal to the owner's mobile device together with video of the room, the front porch, etc. Pressing the "light" button might turn on a light.

Indeed, service dogs could even be trained to press a button that summons help if the owner appears incapacitated. In one implementation, an alert would be triggered (such as an alarm, a light, a signal to a mobile device, or otherwise) and the owner given a set amount of time (such as 60 seconds) to cancel the alert before emergency responders are summoned. In another implementation, the reverse of the normal warning/cancellation sequence may be utilized. In this implementation, a device may alarm to indicate a problem with or for the human, such as a burglar alarm or a cardiac event detected by a watch with an EKG or pulse monitor or a loss of consciousness causing a fall detected by sensors. The dog would have a button for "help", confirming the signal, and a button for "ok", canceling the signal or redirecting it to a lower priority recipient, such as a redirection from ambulance to a neighbor.

In another aspect, "drug dogs" and other animals trained to sniff out things such as contraband may be able to differentiate between different drugs (or other materials). Taking Fang, an airport drug dog, as an example, Fang may have been trained to identify heroin, cocaine, and Adderall. Fang may alert in response to a carry-on bag only to have the owner say that they have a prescription for Adderall and there must have been remnants of a pill in the bag. Rather than search the bag and detain the person, it may be possible to have Fang press the button for "Adderall" (if it is Adderall) and the officers could then tell the person that they should have their partner text them a photograph of their prescription bottle. Without such disambiguation, the officers would likely have to respond as if the dog had detected the worst case scenario. This may be similar to a bomb sniffing dog alerting to nitrogen fertilizer. Because the officers do not know whether the dog is alerting to a very energy-dense material such as C-4 explosive that could be hidden on a person, the officers would be forced to search the person. If the dog could press a button saying "nitrogen fertilizer", the officers would know they were searching for a far less energy-dense potential explosive —allowing them to avoid searching extremely small spaces for example. Another embodiment is where the dog may augment the alert by indicating the relative strength of the scent with buttons. A dog can be trained to detect and differentiate different substances, but it is much harder for them to indicate their certainty level. Current technology allows for an essentially binary "yes" or "no" indicator, while buttons may be assigned to indicate "a little bit", "probably", "very certain", etc. Indeed, even a single button may be configured so that the rapidity, firmness, cadence, and repetitiveness of button presses are processed and utilized to enhance the communication.

It is unknown whether canine language abilities will lead to a substantial improvement in canine intelligence. Language acquisition plays a critical role in the development of much of humanity's most advanced cognitive abilities. Feral children —individuals who have reached adolescence without exposure to language—almost all display significantly diminished cognitive capacity. This is in part because complex cognition is thought to be scaffolded on words and how we use them. For instance, the word "if" is believed to have originated from a word having to do with things being "doubtful". Now that we have "if", however, we're able to have a new kind of conversation that goes beyond the concept of mere doubt. For example, "if you hit the glass it will break", or perhaps even more powerfully, the use of "if" in the context of computer programming. While we may not see a canine Albert Einstein anytime soon, we might see canine word use enabling new abilities not previously available.

Of interest is that enabling linguistic capabilities in dogs may result in improved inter-canine communication. For example, one dog may press the "play" button, and the other dog may then press "play" and "outside". The dogs could then run out of the dog door.

It would also be unsurprising for the canine to suffer less mental distress if the canine can communicate its needs. A dog that is less distressed is less likely to engage in destructive behaviors.

The market for a product like this is likely to be massive. Perhaps even category-creating. Currently over 50 million US households have dogs, and the pets market exceeds $90 billion in the United States alone. Customer spending will likely double or triple if and when many dogs can deploy simple language abilities.

Various devices have been invented to attempt to train non-human animals to use language. Kanzi, a chimp, was taught to point at icons on a board to communicate.

Other approaches to language training in dogs have only been successful in the area of word comprehension, and not really made an attempt at word production or meaning expression, and even then, such efforts were only accessible to experts using home-customized hardware. Anna Jane Grossman, a trainer at "School for the Dogs" in New York City, trained a limited number of dogs to touch the visual images of "yes" or "no" on an iPad.

The late Dr. John Pilley, a retired professor of psychology, trained his dog Chaser the names of over a thousand objects. Doing so took many years of deliberate effort, and still, the result was only that Chaser could recognize words, not produce them. Chaser had neither any understanding, ability, or need to generate those words herself.

In addition, the CLEVERPET® Hub device, which entered the market in 2016, was designed by cognitive scientists and neuroscientists to use software to facilitate learning of complex tasks. In 2019, CLEVERPET® released the source code that enables CLEVERPET®-based training, enabling community members to create games that, e.g., train dogs to learn the names of different colors. Doing so required the use of a secondary computer. Patents and applications related to the Hub device, use or improvements thereon, at least in part, include without limitation U.S. Pat. No. 10,506,794 ("Animal interaction device, system and method"), U.S. Pat. No. 10,349,625 ("Animal interaction device, system and method"), USD775769S1 ("Animal interaction device"), applications PCT/US2015/047431, 16/896,042, and 16/839,003, together with certain non-US counterparts.

Most recently Christina Hunger, a Speech Language Pathologist, used buttons that play recorded words to teach her dog Stella to "say" over 29 words (as of the time of writing). She was able to do so in a time period comparable to that of human language learning—less than 12 months. Remarkably, Stella appears to be able to express new concepts through word combinations, e.g. "water outside" when the button for "beach" wasn't working. Stella also seems to be able to construct proto-sentences (e.g. "want eat play"). The buttons Christina used for this purpose are readily available for sale, and in the hands of a speech language pathologist, can be used for teaching. She distributed the buttons on a cartesian grid "word board."

SUMMARY OF INVENTION

The present disclosure presents devices, systems, and methods for sound buttons capable of emitting sound using less power, greater sound transmissibility, and/or greater resistance to damage and that allow for training both non-humans and humans to communicate more effectively than previously possible. While domestic dogs are used in this disclosure as an exemplary animal, unless the context clearly requires otherwise, from this point forward, terms that refer to dogs are meant, without loss of generality, to refer to any animal lacking the ability to make their needs and thoughts understood at the level of a typical human adult. Unless the context clearly requires otherwise, the term includes humans who are preverbal or with communication impairments.

Training of dogs is highly sensitive to factors that may not play a role—or that play a less significant role—in human training. Several factors are desirable:

Predictability: Dog training is best accomplished by having a high degree of predictability between the dog's action and the result. If, for example, a dog were to press a button on a hexagon tile ("hextile") that is in the spot where "walk me" normally is, having the button respond with "feed me" would rapidly undermine what the dog had earlier learned.

Safety: Any device used in training should not cause any risk to the dog. In particular, a single episode of negative reinforcement early in training may interfere with adoption of the system.

Simplicity: Any device should not be too complex for the dog to understand.

In typical embodiments, a sound button comprises; (i) a shell; (ii) a switch operable connected to a printed circuit board ("PCB"); (iii) a button cap assembly operably coupled to the shell, the button cap assembly comprising a button cap having at least one recess, the at least one recess having a hole and a speaker facing an air space in the button cap; where, when a force is applied to the button cap, the button cap and the speaker move together to actuate the switch, thereby causing the speaker to emit a sound.

In one aspect, the button cap assembly comprises an enclosure having holes through which the sound can be transmitted, but which, in one aspect, are displaced from the location of the speaker. In another aspect, each of the holes is equipped with a valve or shutter with a default "shut" position. In one aspect, the valve may be mechanically opened when the switch is actuated. In another aspect, a pressure generation device, such as a fan, may blow through the hole, opening the valve. In another aspect, the valve may be opened by pressure and/or the air displacement that occurs because of speaker movement.

In one aspect, the sound button has a button cap that is dome shaped. The sound button may have substantially flat bottom (which may or may not have protrusions, such as grips, legs, or switches). A speaker may be located in the dome (preferably in the center) and one or more holes may be located around the perimeter of the dome. In one implementation, a switch to actuate the speaker may be placed at or near the center of the dome, allowing a dog to actuate the speaker without muffling the sound with its paw. In another aspect, the holes themselves are rounded (preferably on the bottom) to minimize the risk of liquid becoming trapped or running into the interior of the button.

In one aspect, the speaker is attached to and/or located within the button cap. When attached to the cap, the speaker may move together with the cap such that pressing or applying a force to the cap causes the button to move to actuate the switch. In some aspects, the speaker is placed in an upward position (facing the button cap and preferably into an air space in the button cap. The placement of the speaker in an upward position allows the sound button to be located in an enclosure, such as a HEXTILE® enclosure, without impairing sound transmission.

In another aspect, a speaker may be in a place or an orientation that does not directly connect to an unobstructed pathway to the outside of the button. In such a case, one or more hollow components (such as a tube) may be used to transmit sound from the speaker to the output holes.

In another aspect, the speaker may be used as a structural component, connecting a switch to the button cap (also referred to as a "top cap"). The rigid frame of a speaker may be utilized to transfer load from the button cap to a switch operably connected to a PCB.

In another aspect, the speaker may be equipped with a KAPTON® and/or other hard plastic membrane that provides a level of waterproofing and/or protection from other hazards. Gravity may be utilized to remove liquid and/or contaminants by turning the button over. Additionally, playing a sound may cause the liquid and/or contaminants to move from a position on the speaker.

In one aspect, a PCB provides some or all logic control for the sound button. In one implementation, the PCB connects to the speaker via wiring while the remainder of the connections, such as from a power source, microphone, and/or a momentary switch, are connected directly to the PCB. These connections may be made through components having holes, or fixed leads that go through holes in the PCB. Another connectivity approach is surface mount technology ("SMT"). Among the advantages of such an approach are obviating the need for soldering wires to connect components, easier testing of the PCB assembly ("PCBA"), and making PCBA testing prior to mounting in the sound button easier and more accurate.

In one aspect, there is a slide switch (a mechanical switch that slides between two positions (single pole) or more than two positions (double pole or multiple pole)). In the sound button, one desirable feature is a slide switch to control recording of sounds via a microphone (although a momentary switch or other switch may be utilized) in a first position, and to enable playback of the recorded sounds in a second position. In one aspect, the slide switch is located at, near or on the bottom of the sound button to prevent accidental switching when the button is interacted with, inserted into a mount, tile or HEXTILE® or rotated. The slide switch may be recessed (independently of or in combination with placement on the bottom of the sound button).

One issue for sound buttons is actual and perceived responsiveness and rigidity of the button. In one aspect, the PCB may rest on a battery cavity to improve rigidity of the PCB. All forces applied to the button cap downwards by the user may be transferred via the speaker (which in most cases is a rigid structure), switch and PCB to the bottom shell of the sound button. Because the forces are perpendicular to the PCB, flexion of the PCB, a potential cause of defects or failures, is minimized.

In one aspect, the battery compartment is at or near the bottom of the device. By making the batteries easily accessible, they are easier to change. Furthermore, it is not uncommon for batteries to swell, particularly after a long period in a device and/or in conjunction with a deep discharge. Indeed, swelling may relate to (a) overcharge conditions that may accelerate parasitic reactions between the electrodes and electrolyte with a corresponding release of heat and gases; (b) poor cell quality and design with low anode to cathode stoichiometric ratios; (c) particulate contamination; (d) mechanical damage to electrodes induced either during cell assembly or from the product application; and/or (e) excessive temperatures. By placing the batteries away from sensitive components, such as the PCB, battery swelling-induced damage is less likely.

Furthermore, it may be desirable to fix the battery compartment cover in a manner that minimizes vibration of the cover when playing audio through the speaker, which, may, among other things, cause resonance and/or reduced audio quality. The battery compartment cover may be fixed with a screw and/or a rubber, soft and/or flexible gasket.

Turning to the top of the sound button, a tab at or near the top portion of the shell and a corresponding indentation in the button cap may be utilized to prevent the button cap from rotating and vibrating while in use. In addition to possible damage to or disconnecting of the speaker wires, rotation of the button cap would cause changes to the orientation of any markings on the button cap, particularly markings on the exterior of the button cap, identifiable by a human and/or an animal.

A critical issue regarding sound buttons, particularly when they are in use in an environment that may be wet or dirty (e.g., when used by pets), is the ability of the speaker to retain a minimally obstructed pathway to transmit the sound while simultaneously minimizing the risk of water or liquid intrusion, particulate intrusion, or other intrusion which may cause damage, particularly to the electronic components. As disclosed herein, the button cap may be affixed to, or proximate to, the speaker. The button cap may have at least one recess and/or cut-out (preferably on or around the perimeter and/or the side of the sound button), and a hole part of and/or adjacent to the at least one recess/cut-out to permit the sound to escape. In some aspects, the hole may be a substantially vertical slot and may also be configured with contoured surfaces capable of directing contaminants away from the recesses/cut-outs.

DETAILED DESCRIPTION OF THE INVENTION

Figure 1:
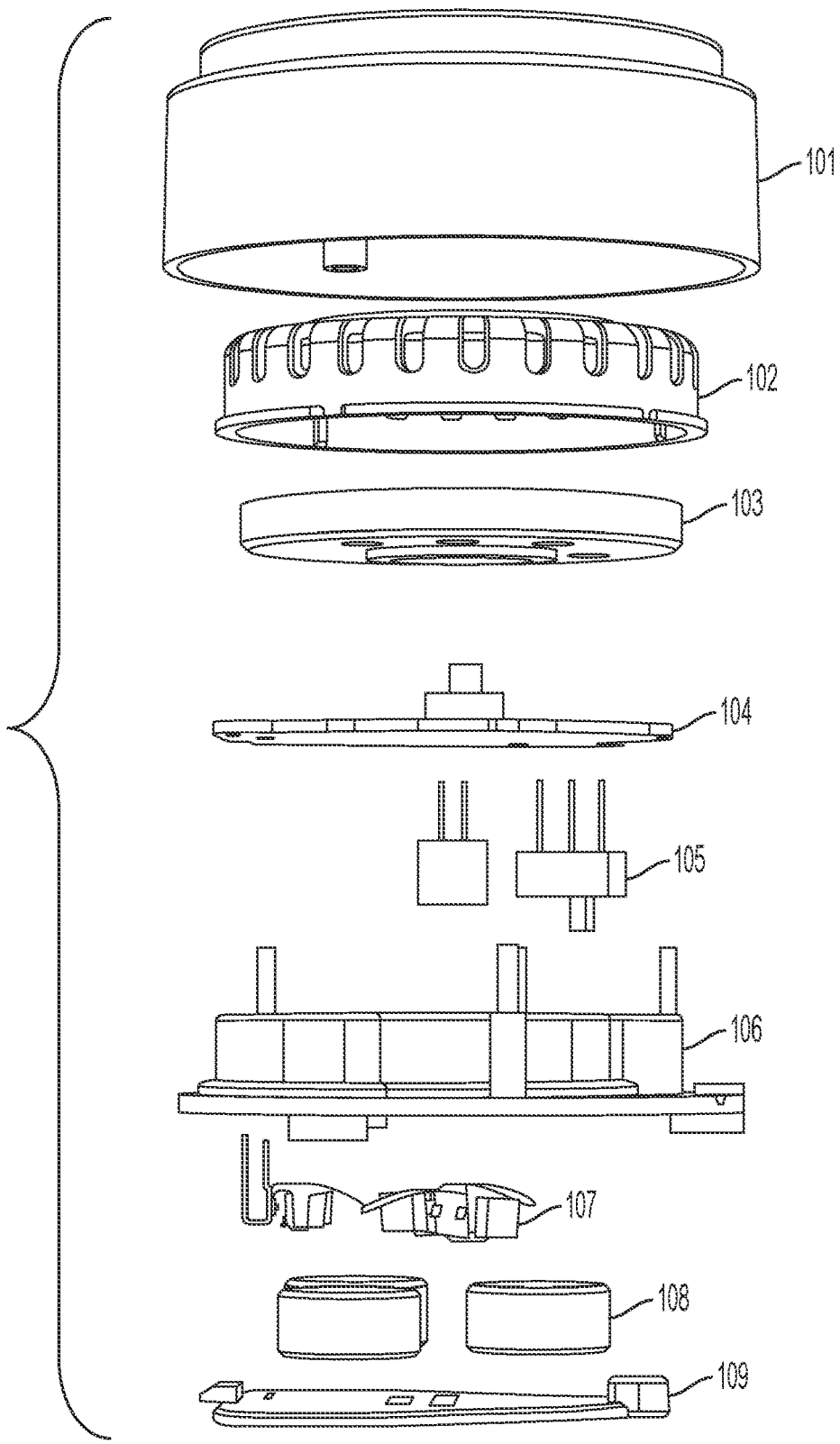
FIG. 1 is an exploded view showing components of a sound button according to an embodiment.

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth to provide a thorough understanding of the present invention. However, it will be readily apparent to one skilled in the art that the present invention may be practiced without these specific details. In other instances, well-known methods, procedures, and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures, or components are known in the art, novel, or obvious.

Limitations of enabling a dog to learn and communicate with buttons include button misuse (e.g., presses "up" thinking it means down), button use with no response (e.g. presses "hungry" but nobody is home to provide food), and the inability to track usage patterns. However, a practical problem is that any improvement to these issues would be expensive and difficult to roll out if it requires new and/or costly hardware. The instant inventions include, inter alia, modalities for overcoming these limitations.

In one aspect, button pressing is tracked for any button by using ambient variations in button performance, sound, or other aspects to differentiate between buttons. For example, a computing device (such as a mobile device, retired from use as a phone or not, a microprocessor such as Arduino, or otherwise), may be used to detect sounds unique to each button and thereby compile a button usage history. As humans and dogs touch buttons differently (and there are differences between members of the same species), the measurements may also be utilized to determine whether a human or a dog pressed the button, and potentially which human or dog.

In one implementation, a mobile device, a "listening" device such as the AMAZON ECHO® or GOOGLE HOME® (or a different kind of computing device) may listen to the word or words played back after a button press and, using voice to text, identify which word or words were said. While voice to text does not necessarily identify a button uniquely, it does identify what playback the dog triggered.

In another aspect, identification of a button may be accomplished by measuring defects caused by manufacturing, aging, overload, climate impact, intrusion of foreign objects (such as dog slobber), location and fit on a surface, and other elements that generate irregular distortion. Because dogs have far greater hearing acuity than humans, detection of such defects should be performed to indicate when a button should be replaced. Such detection may be accomplished by using an audio input device such as a microphone combined with a computing device capable of identifying noises outside of those detectable by human adults. Once detected, the system should monitor the button to determine if the dog's interaction with the button is different than the interaction with other buttons. For example, a "raw steak" button is an obvious one for a dog to repeatedly press, but a loud buzz at 45,000 Hz—well within the hearing range of dogs but well above the hearing range of adult (and most non-adult) humans—would likely dissuade the dog from pressing the button.

In one aspect, such a noise may intentionally be incorporated into the sound output from a button. This would help to solve the problem of dogs, newly empowered to communicate, making repeated demands for things such as doing on a walk. A dog may need to go outside three times a day for reasons relating to voiding of bladder or bowels but may want to go outside every 15 minutes. Of course, a failure to take the dog on a walk after pressing the button would make training the dog far more difficult, impairing their ability to learn and rely on the buttons. In one aspect, every press of a certain button may be made unpleasant with such a dog annoyance sound ("DAS"). In one implementation, the DAS may be activated only once the dog has already been trained as to the meaning of the buttons. In another aspect, the DAS may be presented (and optionally increased in annoyance level with repeated presses) only after the button has been pressed once (and, optionally, the human has confirmed that they heard the sound by sending a signal to the button, such as via a networked device or by actuating the button in a particular way. The DAS may reduce in volume with the passage of time between presses. In one aspect, the dog may be warned that the press of the button will trigger a DAS, such as by having the button light up, emit a small sound, or otherwise.

In another aspect, the button may be "locked out" or deactivated under the same rules as issuance of a DAS sound described above. Use of a DAS has the advantage of allowing a dog facing an urgent problem (such as "let me out before I soil the carpet") to press the button despite the DAS. By imposing a small cost for multiple presses within a set time frame, button misuse is reduced. Because dogs may press a button repeatedly until the request is acknowledged by a human (or by a device operatively connected to the button), the DAS or lock out may not be triggered if there are multiple presses during a set time frame (such as 5 minutes from the first press). Alternatively, or in addition, the DAS or lockout may not be actuated until a human acknowledges that the dog has pressed the button (as described earlier in this paragraph).

Returning to the subject of irregular sound distortion, it is likely that speaker performance will change over time. In one aspect, any system, method, or device that works by identifying irregular sound distortion may update the sound profile for each button as it detects minor changes. In another aspect, changes in sound distortion may be utilized as an early indicator of a device failure.

In another aspect, audio identifiers may be embedded within the audio produced by the buttons. While the button may be programmed to emit such identifiers, we initially address inclusion of the identifiers within the sound recorded and played back by the button.

In one aspect, the commands and other words recorded on the button are first recorded on a computing device such as an ANDROID® or iOS® device. The device then plays a sound that includes the commands or other words but also relays data. For example, dual-tone multi-frequency signaling, or audio steganography such as least significant bit signaling, phase coding, echo hiding, and spread spectrum. When using DTMF or similar technology, the carrier signal may be capable of holding more data than needed to simply identify the tile. In such a case, extra bits may be used for error correction.

A computing device capable of detecting sound may then "listen" to the sound and decode the data.

In another aspect, it may be desirable to use an always on listening device (the term "always on" refers to the category of device, not to the amount of time the device is on) such as the AMAZON ALEXA® or GOOGLE HOME® to listen for button presses and/or decode data within the sound.

In another aspect, an image recording device, such as a camera, may be utilized to image tiles that contain the sound buttons and their locations.

Once the tile layout is identified, in one aspect a device is used to transmit to the buttons a configuration, preferably including audio files, that matches a configuration to which the pet is accustomed. In one aspect, when multiple pets regularly use the same device, the device may identify the animal and customize the tiles for the animal. In one aspect, buttons and or tiles may be equipped with a scent generator and/or a visual screen that match the "normal" configuration for a given pet.

Because of the desirability of mapping the tiles, we explore several modalities for doing so. In one aspect, each button and/or tile is equipped with a QR code. In another aspect, the materials used for the tile, HEXTILE©, and/or button is made with the inclusion of materials comprising more than one color, materials comprising more than one level of reflectivity, and/or a single or composite material with unique texturing. These differences may be used to identify a given tile, HEXTILE© or button without the need for a specific code.

It is desirable that configuration and/or use data be stored. This may be utilized to train an AI, to determine efficacy of different configurations based on dog age, size, gender, or breed, or to measure a dog's performance and behavior over time. In one aspect, changes to behavior over time may be used as an early indicator of a possible change to the dog's health status. For example, a dog asking to urinate an average of four times a day may, over time, begin to average five times a day, indicating a possible change to the dog's ability to hold urine.

In one aspect, the tiles and/or buttons may use a camera to identify whether a dog is in proximity and/or which dog is in proximity. An infrared camera—even one with a single pixel of data—may be used to detect proximity of a dog. In one aspect, an IR and/or other light frequency transmitter may be located on the tile or button or proximate thereto and an IR and/or other light frequency receiver may also be located on the tile or button or proximate thereto. Different fur types and different levels of fur coverage, as well as different sizes, will alter the backscatter of that light. The backscatter may be used to identify the dog and/or the proximity of a dog.

In one aspect, an image of the dog may be used as a reference point. In a preferred implementation, images of the top, side and bottom of a dog may be captured with one or more known colors on an article in the photograph. The photo data may then be calibrated to the camera (one or multiple pixels) by having the camera read the same (or a substantially identical) article. In one implementation, the data for calibration is generated for a camera type, and loaded into the software on the device, obviating the need to image the article with the tile or button camera. In this way, dogs with multiple colors may be identified when the button or tile mounted camera matches one or more colors present on the dog. On another implementation, the tile and/or button would image the dog's color over time, developing a library of matching colors that can later be used to individuate the dog.

It is further desirable to know whether a person or a dog pressed a button. There are a variety of embodiments herein to accomplish that identification. In one aspect, capacitance may be measured at the button. Humans may press the button with a largely non-detectable object, such as a pen, to distinguish from a dog pressing the button. In another aspect, a long press may be utilized (although a dog is capable of a long press as well). In another aspect, a press pattern, such as a "triple click", may be used to identify a human press. In yet another aspect, the button may be capable of detecting a "side press" or "squeezing" by the presence of a button or other sensor configured to identify pressure on one or more side of the button. Because a dog would be very unlikely to press a side button, and even less likely to squeeze the button, the chance of mistakenly identifying a dog's press as human is greatly reduced.

Ease of connectivity is a concern for systems of any level of complexity, and a particular concern where there are multiple components that need to communicate via a network. In such a case, an exchange of network credentials is highly desirable. Other credentials, such as credentials allowing data to be associated with an account or device, may also need to be exchanged. In one aspect, credentials are exchanged over a near field computing system, such as BLE. In another, credentials are exchanged using light, such as IR sensors and transmitters. Credentials may also be exchanged via a direct wired connection.

Nearly all portable phones and tablets are now equipped with a "flash" to accompany the camera. Data may be encoded for transmission via light emitted from the flash. In such a case, even where there are challenges to network connectivity (such as radio interference), light sensors may be utilized to receive the transmission.

The desirable size of the tiles, distance between buttons, force required to actuate the switch, and other factors may vary with the dog. For example, a tile perfectly designed for a Chihuahua would likely be too small to be usable by an Irish Wolfhound. However, the range of sizes and other factors that a dog requires fit into a range, not a fixed amount. It is thus possible to create a tile sizing mechanism. There may be a sizing knob with a plurality of "click in place" positions. In another aspect, tile sets may be designed for dog size ranges.

Dogs get old, shed fur, grow weaker with illness or age, etc. Identification of a dog and/or the amount of force or other interaction with the embodiments herein may vary as the dog's condition varies. In one aspect, the system utilizes a moving average of the last N readings, and if the current reading is within a specified range of that average, it is considered to be a match. Thus, for example, identifying a dog by the color of fur would fail over time if an initial measurement were maintained. Instead, using a moving average (whether over time, a number of interactions, or a combination thereof) allows for variations in dog appearance over time.

Because it is important in many cases that a binary value reflect whether a button has been pressed, the microswitches are actuated by pressing on the button. In a preferred implementation, the travel distance of the microswitches required for actuation is short, such as 1 mm, 1.5 mm, or 2 mm. In one implementation, the microswitches provide feedback indicating that they have been pressed. Feedback is anticipated to frequently take the form of a sound and/or a "click" resistance that results in rapid movement as the switch reaches or approaches the actuation point. Feedback may also be done via a vibratory device, lighting components, or otherwise. While the binary switch is desirable for reasons such as providing feedback to the dog pressing the switch, it is also important to know whether the dog is pressing the switch heavily or lightly, whether the pressure value is changing over time, and other data relating to the amount of force applied to the button. The resistive force sensors provide such data.

In one aspect, the temporal relationship between changes to the resistance sensor readings and the button, the relationship between the force exerted on the button and the pattern of the force, and the length of time the button is held (together with force changes during that time) is provided together with human, artificial intelligence ("AI"), or image analysis of what the dog is engaged in or wants, is provided as part of a dataset to train an AI. Once trained, the inventions may utilize the AI and the resulting data sets to provide additional context to humans with regard to what the dog's behavior means.

In some aspects, the dog initiates communication through some present action. The dog is presenting itself to a listener. The listener may be a person, another animal, a listening station during training, or a similar modality. We note that while we use the term "listener", it should not be interpreted in this context as limited to auditory observations only. For example, text, lights, vibration and/or other stimuli may be "listened" for. During normal use the present may simply be that gesture at any location, as assessed by a monitoring device. An example of a present action may be a play bow. Another present action, and one that canines seem to adapt to easily, is the press of a button. A start tone is presented to the dog to acknowledge the presentation request. The start tone may mimic a human exchange, such as playing a voice saying "I'm ready."

In some aspects, at this point the dog may generate a volitional command. In this example, these commands are footsteps (or paw steps) of particular types: either a left or right foot, and then a direction of motion to indicate the type. For example, step1 and step2 may be: left foot moves left, then right foot moves left. Using four directions for decoding each step, considering only the front two legs, there are 64 tokens a dog could generate. Other traits of footsteps could also be used in the step typing. For example, the duration of a paw lift, or the height of a step or the force transferred onto a forelimb from a hindlimb. In one implementation, each step would be acknowledged with a click, and/or feedback about the received step type. The completed two steps would map to sound (semantic) buttons, presumably with auditory association that already carry meaning to the dog.

Semantic buttons are communication modalities. The term is used in both data reception and transmission mode. That is, a button may be used to send data from the dog (such as pressing the "go for a walk" button) and/or to send data to the dog (such as beeping in response to a press to alert the dog that the press was detected). In one aspect, semantic buttons may light up and/or make a sound and/or release a scent and/or change colors to indicate (a) which of the buttons are possible candidates for the completion of the communication sequence, or (b) which button has been selected.

In one implementation, the completion of steps would result in an internal presentation of a token. In this example, if audible feedback were used and a button means "outside", that means that the dog would hear the voice "outside" delivered reasonably quietly from the speaker. The speaker may be located on a tile, proximate to the buttons, in the dog's ear, oriented towards the dog or otherwise. This is delivered during the intertoken phase. At each intertoken phase, a delay in action results in the full message sequence being played back to the dog. Continued steps would append more tokens to the end. Note that the delay could be as short as 0 milliseconds (ms) or as long as 10,000 ms (or even longer). In a preferred embodiment, the delay substantially corresponds to the cadence of timing of human vocal response to a stimulus provided by the dog.

In one aspect, a "cancel" motion may be utilized. The "cancel" motion may fully cancel the communication sequence or may "undo" the most recent portion or portions of the sequence. Different motions may be utilized for a full cancel and for the undo cancel. For example, a fresh play bow might cancel the full message and start fresh, while a sound (detected with a microphone) such as a bark, or a different motion, such as turning in a circle, may initiate the undo cancel.

In some embodiments, a series of tokens with incorrect grammar would append an error tone and cancel the message. In some embodiments a voicing from the dog would collect all tokens since the last play bow and render the sounds for a human and dog audience. In other embodiments, and/or based on user preference settings, after sufficient delay without a cancel (full or undo) or present action, a token sequence would be broadcast. One optional difference is having a dog explicitly opt into a broadcast vs opting out. Related to this, some users may favor voicing from the dog as this begins to shape qualitative sound generation that matches the target sequence. This is the public message, which people receive and respond to. It may be played from a speaker or a smart watch or be sent as a text message or otherwise.

In one aspect, a temporal element is utilized.

In another aspect, dog motion may be interpreted by the system and converted into a sound and/or other signal. For example, a dog that wants to go for a walk might walk in place to trigger the "walk" command; a dog that wants to urinate might lift a hind leg (primarily a male behavior); a dog that wants to void its bowels might squat; a dog that is hungry might mimic chewing motions. In one aspect, the system would provide feedback by saying the corresponding word. In another aspect, where the dog's message is unclear (a female dog squatting might mean defecation or urination for example), the system might say the possible words and select one based on a dog's reaction or motion or sound. It should be appreciated that buttons are optional with a position and/or motion and/or sound recognition system.

In some embodiments, the public message is only broadcast if traits of the dog voicing match traits of a token render (examples might include amplitude modulation for the number of syllables of the words, physical movements matching word complexity, etc.). In some embodiments, the broadcast message will include the dogs voicing. In some embodiments, the dog's voicing will be transformed by a vocoder to capture aspects of the target message. In other embodiments, a variational autoencoder will map sounds generated by the dog into natural language speech. In other embodiments, a custom neural net, trained on a corpus of recorded dog voicing and target, may be used for translation from dog learnable actions and/or dog voicing, to the spoken counterparts in human natural language. In other embodiments, pre-recorded sound from the dog will be used to render each of the available tokens with the phonetic palette the dog is capable of, allowing the dog to "pronounce" each of the words. Notably, both the dog and the human will "hear" the sound created by the dog. As the dog's initial voicing stretches closer to the target sound, their palette may expand, and each of the tokens may re-render. One can appreciate that through learning, a dog's voicing in person will better approximate a target, and the rendered public voicing will also improve, and may decrease the decoding error for large lexicons with similar tokens. These traits will both help a dog learn, and allow human listeners to assess progress. In another embodiment, publicly voiced pairs may allow listeners (dogs and humans) the ability to assess the proximity of voicing to a target.

Sensors may decode the state of a dogs external working memory into multiple channels, as well as how that state may be updated based on the sensors that encode the dog's actions and intentions, the existing state of the working memory, and the context of the dog in communication. A sensor state may be the observation of a left paw being moved with a particular velocity to a particular location for a duration of time. The sensor data will be encoded into a tokenized state in the external working memory. The process of tokenization may have access to the previous state of the working memory buffer. One may consider many inputs to act as "transforms" on the token state in working memory. In some cases, the impact of new sensory data will be to append tokens to a list. But other embodiments are better described by a function that map from previous token state to new token state, conditioned on the sensor input. Finally, additional context may impact the transform.

It should be appreciated that in some aspects, some or much of the linguistic complexity is handled by the sequence of actions that generate the token. The voicing of the dog could range in specificity anywhere between consent to broadcast (no qualitative impact), an opportunity to customize the quality of the rendered output (the words in the message are the same, but the acoustic aspects of the broadcast message adapt to traits of the dogs voicing), to a system that gates the output conditioning on rules with increasing specificity, ultimately requiring the dog to produce acoustic messages on their own, which could be understood without translation.

In terms of training the system, training may be done by the dog, the person, or a combination. For example, a play bow followed by walking would encode left-foot forward, right-foot forward, which could decode as the WALK token. A loud voice (a bark) could be rejected as an acceptable voicing format. A quiet murmur, could be detected as a voicing attempt, broadcasting the contents of the previously generated WALK token.

In one aspect, the tokens may be denominated in a way to escape or bypass normal language conventions.

In one aspect, the technology discussed herein may be utilized to enable a multi species or multi animal exchange language. Of course, humans and dogs are of different species, so in this context we are talking about a language that may also be used between different members of a non-human species, between members of more than one non-human species, and/or between humans and a member of a non-human species. Such a language may be constructed by creating modalities whereby common meanings are assigned to communication modalities where the information disclosing communicator is able to send a signal that is understood by the information receiving communicator.

Taking as an example the communication of the meaning "I want to play" and using a dog and a cat as the two species: The dog is capable of hearing well and pressing buttons. The cat is capable of hearing well and minimizing unintentional body movements (such as when hunting prey). The dog may press a button to trigger the sound "let's play", which the cat understands. If the cat wishes to ask the dog to play, the cat may limit all body motion except for the front right paw, which the cat lifts twice and a digital vision system identifies as associated with the term "let's play", triggering that sound.

To the extent that one species is incapable of understanding information from another species, a "no translation" indicator may be utilized. For example, a human may want to tell a dog, "we'll go to the beach tomorrow". While the dog can understand "beach", it may not have the temporal sense to understand "tomorrow". The human may receive feedback, such as a buzz, when they attempt to input the term "tomorrow" into the communication device.

In one aspect, there is audio output capable of generating sounds easy for a dog to hear, but not disturbing to people nearby. This may be accomplished by controlling the volume, controlling the pitch, or a combination. Much of this may be achieved by orienting the output and controlling amplitude. Using higher frequency sound output may be desirable in some embodiments.

In some implementations, audio feedback may be used for "self-speech," that is, feedback about previously generated tokens that can be perceptually assessed by the dog before generating new tokens, modifying tokens, canceling past tokens or messages, or transforming the tokens present in the scratchpad/sketchpad. Roughly, token sequences may serve as a sketchpad for arranging an intended message, assessed before it is broadcast. It serves to reduce errors in translation of Dog Sign Language (described below) to tokens.

A GPS tracker (or other geolocation technology, such as Wi-Fi triangulation) may be included in some embodiments. A physical location may assist in translating steps into tokens in a context sensitive manner.

In another aspect, environmental context may be utilized to improve translation.

Translation may, in some implementations, be bidirectional. For example, weather, age and/or time of day may be utilized.

The footstep translation to speech is referred to as DSL, for "dog sign language". But also, could have a "dance sign language," sometimes used to refer to a human performing the same footsteps that a dog would have to do, in order to send a message. It should be understood, of course, that it is thought that dogs can understand many words.

A system that initializes vocalization from a play bow has advantages, including in terms of discoverability and/or positive affect. But it could be a source of misinterpreted commands in the case of genuine high energy play (e.g., not intended by dog as linguistic communication). As such, subsequent steps may be filtered by energy, to keep deliberate directional steps as part of language behavior and treating large bounding steps differently. In some cases, the map from paw steps to tokens could differ during play. In one simple exemplary mode, high energy steps would not translate into tokens, and thus no clicks would be created from these "non-linguistic" steps, cueing the dog to change their behavior if language communication was the goal.

Human language may have developed (in whole or part) by harnessing neural machinery for planning and evaluating mutually exclusive sequences of commands. We note that the sequencing of mutually exclusive motor commands demands a serialization of events. Regardless of the speculative evolutionary past, one aspect of the inventions may harness dogs' existing "language like" internal capacities (e.g. reasoning about the outcomes of chained future sequences of actions), and provide the digital armature to extend their communication capacity (e.g. via external working memory, phonological loop, error correction tools, sound generation, etc.).

In one embodiment, the concatenated representation of a new sensory volley, the current token state and the current context may serve as an input vector to a neural network. The output of the neural network may be the subsequent token state. Alternatively, the network may be construed as having multiple output channels. On channel may be the internal voicing to the dog. Another channel may be the public voicing, presented to both the dog and human. Yet a third channel may be the voicing presented to a person, and not the dog. The desired perceptual attribute may be specified for any or all these channels. We refer to each decoded channel as a different "rendering" of the state of working memory. Importantly, the state of working memory is shared across all channels. Also relevant is that the perceptual error between a rendered state and a target state may be assessed differently across channels, allowing for different observational capacities in the listeners. For example, dogs may be well attuned to high frequency differences, but may confuse plosives. Thus, the magnitude of error for imperfect rendering should differentially and accordingly impact a gradient-descent-based learning algorithm that includes labeled examples in multiple output modalities.

In some training regimes the input output pairs of sensor, state, and context may be aggregated over multiple dogs. In other contexts, the training may be focused on the observations of a single dog. Especially during learning, the opportunity exists for the dog to learn how to create the actions to generate a desired communication output. During this time, an algorithm may work to update the mapping from sensory data to the dog's transmitted message. Nonetheless, knowledge from other dogs may assist in creating a good starting point, as well as preventing rapid fitting procedures that emphasize recent observations from becoming stuck in a local minima likely to prevent long term learning.

Similarly, it is possible for rendering algorithms to update with different criteria for human and dog voicing. The dog voicing may be evaluated for its capacity to accurately model the dog's tokenized actions, allowing for correction of errors. Clarity with respect to the dog's perceptual system is important for their own learning. On the other hand, people may be motivated to hear clearly as well, or they may prefer to have alternate rendering. The latter is possible because the cognitive domains of understanding the speech may be low for a human, enabling transformations in the perceptual domain that are aesthetically satisfying. For example, by rendering an acoustic signature to make speech output feel more "dog like" or even characteristic of this particular dog. Rendering a visual display may emphasize the rules of grammar, and correction of errors, or may simply emphasize the creation of visual rewards aligned with correct grammar or shaping trajectories consistent with a target learning activity. Or in another example, allowing context, such as the repetition of a word over and over, to enable an implicit emotional tone. Such controls could be determined by individual users of the inventions.

Engagement with the teaching system (for dogs) and the communication system (for humans and dogs) may be used as an optimization signal for the design of good token transduction, decoding, and rendering, using best practices in reinforcement learning, neural networks or other frameworks for artificial intelligence.

In some embodiments, the contents of the working memory may be an estimate of the intended communication. As such, additional sensory data serves as a correction of the tokens that exist within this state. As such cases there is a benefit to indicate the region of transformation of a desired modification. For a document, the notion of a cursor is used to select and transform aspects. For a linearly extended audio output, the time of action may be an important indicator of what an communicator wishes to modify. That is, upon hearing a "readout" of the current state, the moment of initiating a command may be used to inform the subsequent transform of the token state.

We also teach translations between sound and postures. Things worth establishing:

A dog may learn to press buttons, and then transfer that skill to an environment without buttons. This could be accomplished, inter alia, by external sensors that accomplish that goal. Such sensors may include (among others) an accelerometer bracelet, a pressure sensor in booties, or in the pads of the feet, capable of detecting, a array of dry electrodes over motor cortex, a ratio of back scattered photon counts between two wavelength of light, indicating deoxygenation of hemoglobin in a sub-cranial voxel, a camera and processor estimating the contact of a paw with a button region. Any of these signals could be used as predictive signals leading to a dog's button press. Similar behavior, even in the absence of a button, could trigger a speaker to emit a button sound. This gives the dog a chance to realize that their own actions control an acoustic word command. Repeating the same preceding actions would trigger the same word symbol.

While learning that these signals are part of a volitional control system, it helps to have a perceptual readout of actions, and of the system state.

In some embodiments, the maintenance of a spatial grid of concept ("a semantic map"), may be transferred to a different location or action. For example, the X and Y location of a button may be transferred to the angular position of the dog's head, left-right and up-down. By angling the head and stomping feet, the dog could issue an auditory command. Notably the "map" could be learned with buttons, including the meanings of sounds and symbols, and then the transfer could allow the meaning to move to another modality without the buttons. This establishes that the abstract symbols have the same spatial relationship and meaning. For example, preserving the meanings and relationships of position, "home" and "door" could be next to one another in the second modality.

A metaphorical relationship exists for a grid of icons on a monitor, and a mouse as a spatial navigation device. In this case, the angle of the dog's neck acts as. As the dog were to orient its nose, "move it to the left" this could trigger a neighboring virtual button to present. As a metaphor, a button can have a "hover" state when the mouse is nearby. An auditory feedback device could have a "nearby angle" presentation, indicating to the dog what would happen if the action was triggered.

In one embodiment, the hover action could be a presentation of the target word at low volume near the dog. In one aspect, a consent action may be utilized as a trigger. In another aspect, machine learning may be utilized to determine a trigger. In another aspect, a sound, body motion, or combination thereof may be utilized as a trigger. A trigger could be a particular sound like a whiny, or a hopping motion of both front paws, or another motion It is anticipated that the dog will be the source of the trigger, although the system may be configured to utilize another trigger source. Upon a trigger, the system could register to confirm "the latest suggested action." That action might be the subsequent acoustic broadcast of the word at a louder volume.

It may be possible to keep track of both "internal voicings," e.g., the stream of events that the dog generated by visiting a semantic position through body posture, as well as the "public voicing" that they initiated. The relationship of these symbols can be used to infer a greater sensitivity to the dog's communicative intent. A public voicing may also create a text message, while an internal voicing may be logged as an event for aggregate review later.

A dog's action with respect to a button may be paired with a sound to indicate environmental control. For example, the action of the dog would then increase or decrease the brightness of the lights. A query {ADJUST ME?} sound may be presented to the dog, paired with a flicker dimming of the light. The meaning would be: do you want to change the lights? The format of query and orienting change would indicate to the dog, this is a part of the world you can control. Again, for a user interface, by metaphor, we can realize that a slider grants us analog control of some parameter. An acoustic cue might provide the same indication for affortance to the dog. LIGHTS MODULATE+{ADJUST ME? Sound} . . . analog behavior is mapped to room brightness. The same could be used for control of volume, or temperature, or a screen.

A visual display may be used to indicate the state of communication to a dog. In some embodiments a grid of spatially arranged semantic tiles afford being directly pressed. In other embodiments, a visual referent of the semantic tiles could be triggered. For example, a whole grid may be depicted on a screen and then the dog's actions or posture or sound generation would be mapped to a "press" or one of the semantic tiles. The board serves to map learnings from one domain (HEXTILES®) to another (a screen). As the effectors may differ considerably on the dog's part (such as a sound and stomping both front paws), the dog would preferably be presented with the ability to learn about the space of potential commands without committing to them. One such possibility is to create a visual guide on the button grid, which could reflect a threshold probability of decoding a word. Thus, if a particular action were performed, the top three interpretations could light up yellow (indicating progress to potential selection, but not selection yet). In another embodiment, a sequence of actions of the dog would navigate a "tree structure" of messages, whereby future choices are visible. If a dog has a particular target button in a virtual space, the encoding of the actions required to get there could be visible.

For another metaphoric interface for UX to the dog domain, television remotes allow for four button presses (up, down, left, right) to select the next letter. The four most common letters may be presented to allow for a shortcut in. Even if the mapping is not dynamic, there is room for a visual representation to indicate both the state of working memory, as well as the further state, conditional on actions. Yet another metaphor: autocomplete in sentence generation.

Morse code is a mapping from dots and dashes to letters. Written languages map letters to words. Now consider a map from eight "posemes" to 512 semantic buttons. A random mapping may take more time to establish and learn, but a sparse tree structure, whereby similar chains had similar communicative intent may be useful to the learner. Importantly the composability of the "parts" (e.g., a pose) would have a semantic reinforcer that carries meaning to the dog. In one instantiation the semantic meaning may be carried by having the system produce a sound, e.g., speaking the semantic token.

Combinations of feedback systems may also be desirable. For example, saying the sound, then showing the video clip of the dog pose, then showing the sound again. The order and slight delay of these events creates a stream of experiences tightly coupled in time, with a potential interpretation of causal relationship. Regardless of the interpreted correlation or causation, their proximity in time, and repetition at different moments, creates a binding of meaning between the symbol sets. In this case, the disparate perceptual aspects get reinforced as "carrying the same meaning." Ultimately, a dog may generate a sequence of poses in isolation of the visual display, and the spoken "message" would only be broadcast. As such, the visual display acts as an external sketchpad of working memory. The goal state of communicating a sentence/message/command would have a direct "read out" from the sketchpad of working memory.

For yet another metaphor, we are helping the dog write a text message or email. The status or correctness of the intended message is inspectable by the sender, before it is sent.

In one aspect, a transform of working memory may be expressed as a shared public communication.

Consider the goal state of going outside. If the dog realizes that the GATE for going outside is emitting the utterance "outside", these are tools that build to emitting that utterance. The production of posemes that reliably trigger an internal view that matches "outside".

The latter stage is a denoising of communication that tolerates exploration and failure. A rewards-based system may not limit internal utterance. But may throttle public utterances. For example, 100 per day, or withheld until an observer is near a device.

A dog may recruit a listener. "Come listen to the sentence I built." A person may approach the visual representation of internal working memory. The presence of the audience triggers a read out into the listeners perceptual domain. The dog witnesses the human listening (and hears the message too). "outside now question" The person may then let the dog outside. Or the person may say "not now. We will go outside later." The dog may be rewarded, as the intended message was received. Additionally, the listener may acknowledge the sentence.

In one embodiment, each button press may cause an icon to display at the same time as a sound is played. In some cases, the icon may be a video of a dog doing something, like drinking water. In some cases, the video may be actual footage of the very dog, filmed by the owner drinking the water. In other cases, the icon may be a pattern matching the same pattern on the button (in this context, "pattern" may include a color).

The creation of a shared dog sign language (DSL) is taught. The gesture and posture of a dog's body can encode symbolic meaning. Renderings of these body postures could be shown to a dog when pairing meaning with button presses. Assuming the body posture could trigger the verbalization of the corresponding sound.

Mapping dog sounds to words could anneal based on an iterative procedure allowing dogs to experiment with symbols that map to different audio features in a phonetic way. That is, dogs can hear the phonetic structure, but can't generate the speech. If the subspace of their voicings were mapped on to a set of word symbols, dogs could achieve human intonation of sounds.

A key trait of a language is that some symbol groupings are not valid words or valid sentences. In one preferred implementation, the test for validity is forgiving of errors and/or recognizes close attempts. This allows viewers to understand when a learner has a given level of proficiency, by the absence of invalid sequences of words. Similarly, dogs have a chance to learn valid groupings when they receive feedback that the preceding sequence was a nonsense string. One way to establish this is to create a cue and reward structure for valid sentences, or even more precisely, the construction of valid sentences that expand the learner's capacity at this stage. It is possible to bury reward easter eggs for completion of target sentences that have high utility in the learner's word acquisition. This is like a teacher saying, "use the word 'tree' correctly in a sentence," or, please use one noun, one verb and one object to be valid. The exact sentence itself is not reinforced, but the relations between the parts must follow the constraints. Similarly, an incorrect sentence may refuse to transmit or broadcast to an audience. Therefore, to the extent that a learner is motivated by the reception of the message, they will have the incentive of learning and repeating valid sequences of tokens. (Other token sequences just don't work). Working backwards, it is possible to construct a digital sketchpad with different rules for valid grouping of tokens.

We note as a preliminary matter that the figures are intended as exemplary and not limiting.

Turning to FIG. 1, we see an exploded drawing of a sound button. The sound button may be comprised of a shell [101]. The shell, which may be called "side shell", "top shell", or simply "shell", may be connected to a button cap [102]. In one aspect, the shell [101] and/or button cap [102] may be made of one or more plastics including but not limited to polyethylene, rubber including but not limited to polyurethane, and/or metal including but not limited to aluminum. In a preferred embodiment, it is made from a non-porous material so that it does not absorb liquids or other contaminants. In turn, a speaker [103] fits below and/or into the button cap [102]. The speaker [103] connects to a PCB [104]. In one aspect, the speaker [103] may also be constructed of plastic including polyethylene and/or metal including aluminum. A microphone, a toggle and/or slide switch [105] in turn connect the PCB [104]. The speaker [103] then connects to a housing base [106]. The housing base [106] may be made of the same or similar materials as the shell [101] and the button cap [102]. Battery contacts [107] connect to the housing base [106] and to batteries [108] (as illustrated, they are LR44 batteries, though the type of battery may be varied). A battery compartment cover [109] encloses the batteries [108].

The battery compartment cover [109] may be affixed using a screw, a latch, a gasket, a combination of the foregoing, or other conventional methods.

Figure 2:
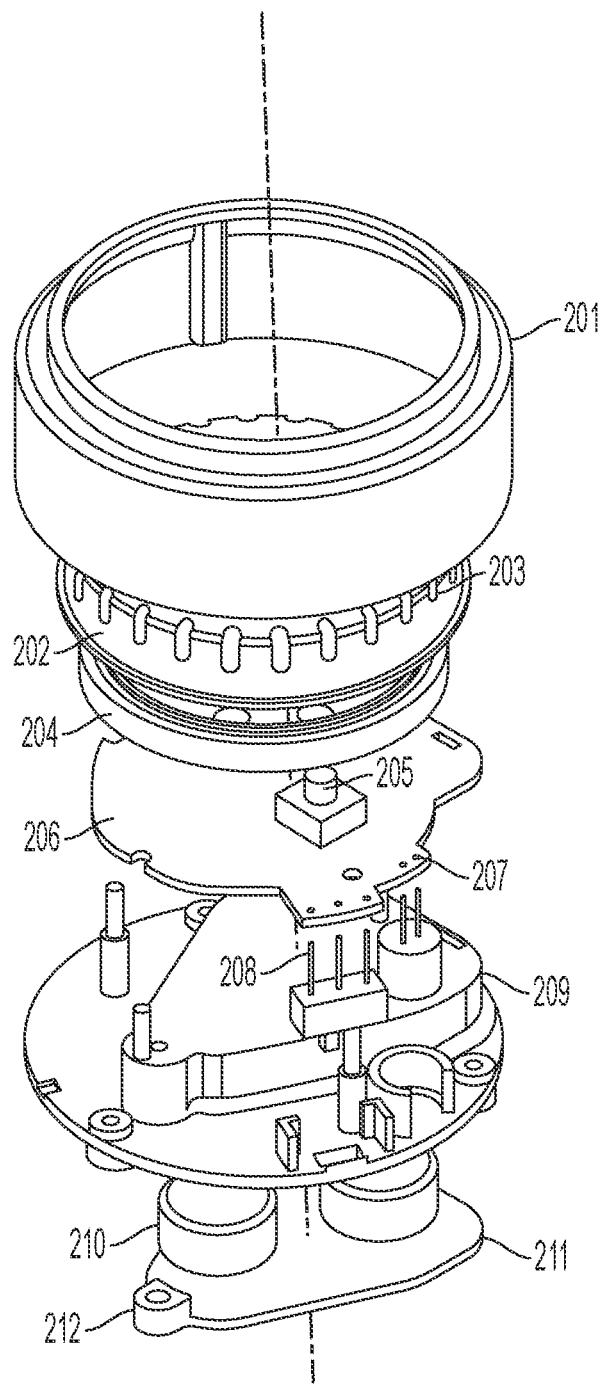
FIG. 2 is an exploded view showing components of a sound button according to an embodiment.

Turning to FIG. 2, we see an exploded view showing components of a sound button in one possible configuration. The internal components are enclosed by the shell [201]. Placed at the top within the shell [201] is the button cap [202]. The button cap (sometimes called "top cap") [202] has cut-outs (also called "recesses") [203] capable of transmitting sound from the speaker [204] through the cut-outs [203], permitting high quality sound transmission. The button cap [202], when pushed and/or forced downward, comes into contact with the speaker [204]. The speaker, in turn, actuates a momentary (or other) switch [205] affixed to a PCB [206]. The PCB [206] then emits a sound (in some aspects, a playback of a recorded sound).

The pins [208] carrying power, microphone output, or other signals, fit through connector holes [207] in and/or by penetrating the PCB [206]. The batteries [210] are enclosed by a battery cover [211], which may be affixed to the battery compartment [209] using a screw (not shown) through, most typically, a threaded screw hole [212], or by other means of attachment. By covering the battery compartment [209] (typically on the top) using an enclosure, such as plastic, the sensitive components, such as the PCB [206], are physically separated from the batteries.

Figure 3:
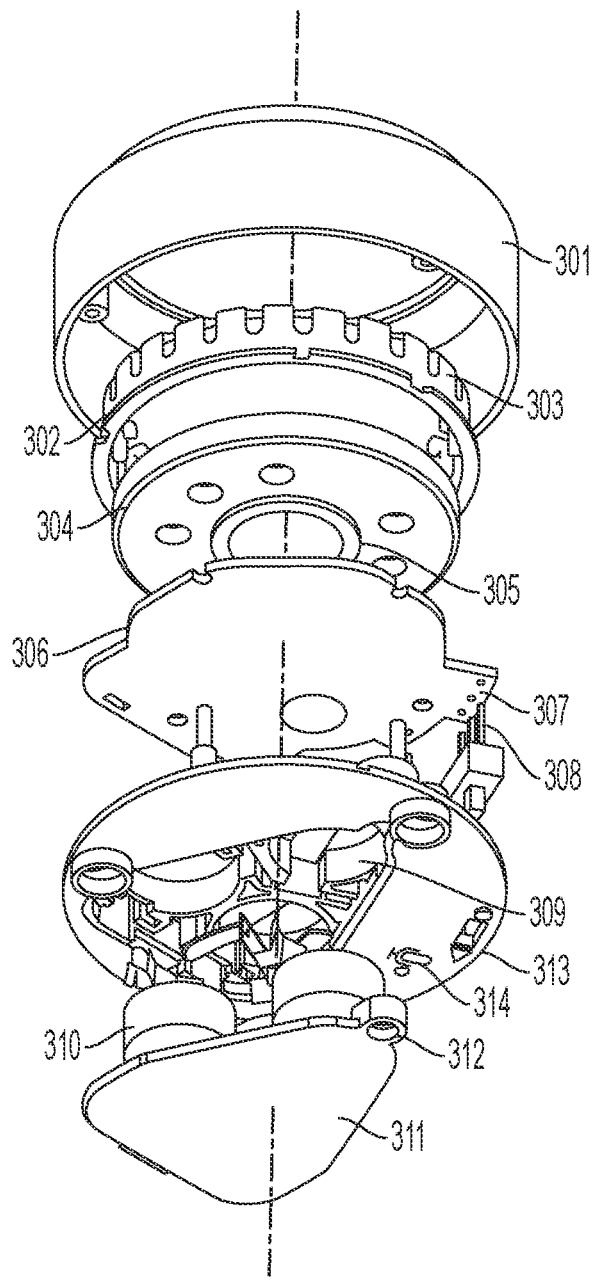
FIG. 3 is an exploded view showing components of a sound button according to an embodiment.

Turning to FIG. 3, we see an exploded view showing components of a sound button in one possible configuration. This view is a bottom perspective view. The sound button is surrounded/enclosed by a shell [301]. The button cap [302] is the topmost component and is, at least partially, enclosed by the shell [301], in one aspect on the sides and a portion of the edge around the top. In one aspect, the button cap [302] has cut-outs/recesses [303] that house/comprise a hole through which sound waves can travel minimally impeded. The speaker [304] projects into the airspace within the top cap [302]. Typically, the speaker [304] faces upward within the top cap [302]. The bottom [305] of the speaker [304] actuates a switch affixed to a PCB [306]. The PCB [306] has holes [307] for the connections of pins [308] connecting the PCB [306] to some or all of the electronics, which may include one or more of a microphone [314], or a power source (typically batteries), below the PCB [306].

The batteries [310] are enclosed in a battery enclosure/compartment [309]. The battery compartment [309] may be held closed using a screw (not shown) in a screw hole [312] that is typically threaded, a clip, or other conventional closure methods. In one aspect, the battery compartment [309] may be made of one or more of plastics, including but not limited to polyethylene, rubber including but not limited to polyurethane and metal including but not limited to aluminum. A switch [313], whether a slide switch, toggle switch, or otherwise, may be utilized to control volume, control erasure and/or re-recording of a sound, switching between sounds, connection to a wide area and/or local area network or connection, or otherwise.

Figure 4:
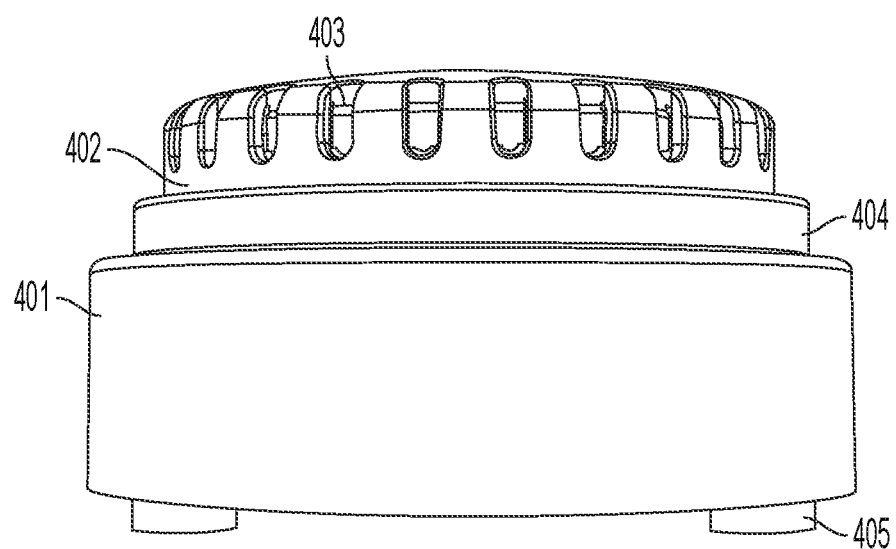
FIG. 4 is a side view of a sound button.

Turning to FIG. 4, we see a side view of an assembled sound button. A shell [401] encloses a power source, electronics, PCB, speaker, and switch(es). The shell may have differing circumferences, such as a reduced circumference at the top [404]. A reduced circumference may be used to keep the button cap [402] in place, may be used for style, may be used as a collection point for contaminants, or otherwise. The button cap [402] has cut-outs [403] with air space (one or more holes and/or slots) to permit transmission of sound from the speaker and/or into the enclosure with few or no obstructions. In one aspect, the sound button may have feet [405] to minimize contact with a floor surface, to which to affix a substance to grip a floor or other surface, to fit into an enclosure, or otherwise.

Figure 5:
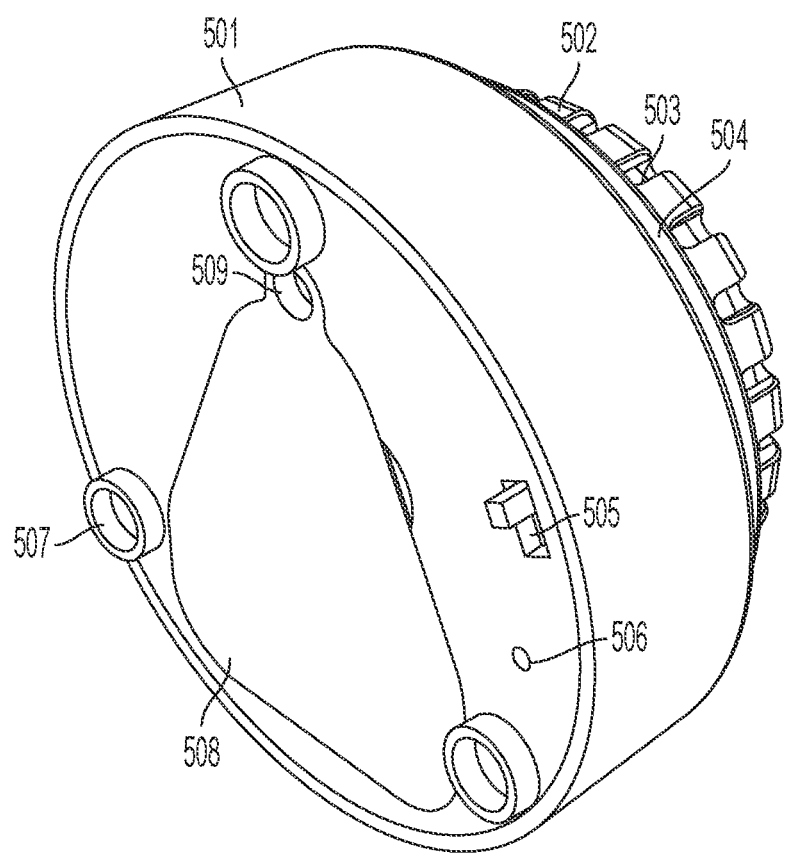
FIG. 5 is a bottom perspective view of a sound button.

Turning to FIG. 5, we see a bottom perspective view of an assembled sound button. A shell [501] encloses power, electronics, PCB, speaker, and switch(es). Portions of the shell may have different circumferences, such as a portion [504] with a reduced circumference at the top. A reduced circumference may be used to keep the button cap [502] in place, may be used for style, may be used as a collection point for contaminants, or otherwise. The button cap [502] has cut-outs/recesses [503] with an air space (one or more holes or slots) to permit transmission of sound from the speaker and/or into the enclosure with few or no obstructions. In one aspect, the sound button may have feet [507] to minimize contact with a floor surface, to which to affix a substance that grips a floor or other surface, to fit into an enclosure, or otherwise. A microphone input [506] will typically be located on the bottom of the sound button, but may be placed in other locations on the sound button as well. One advantage of locating the input on the bottom is a greatly reduced risk of contamination or blockage of the sound input. In another aspect, the microphone/sound input may be located within the button itself. In a further dimension, the microphone within the button itself may receive sound through the hole in the cut-out [504].

A switch [505], (e.g., a slide switch, toggle switch, or other switch) may be utilized to alternate between sound button functions, such as recording, switching which recording is played, playback, maintenance, etc. A battery cover [508] may be affixed using a screw and (most typically) threaded screw hole [509], clasp, or other conventional methods of attachment.

Figure 6:
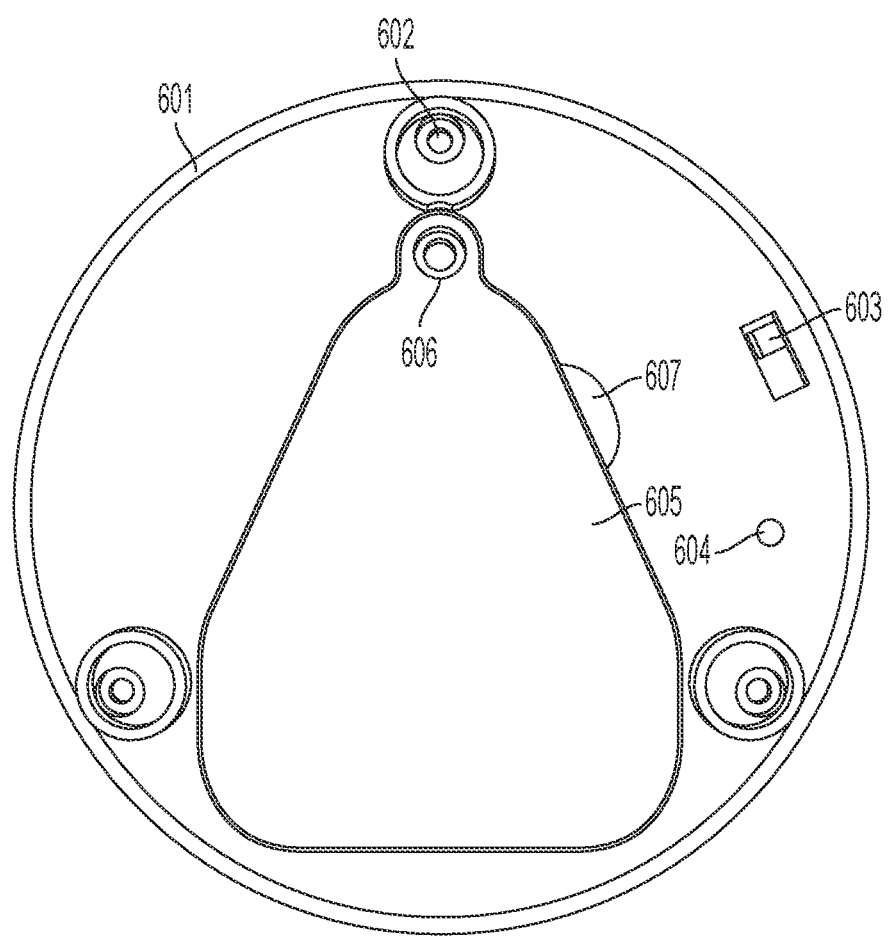
FIG. 6 is a bottom view of a sound button.

Turning to FIG. 6, we see a bottom perspective view of an assembled sound button comprising a shell [601], feet [602], a microphone [604], a battery cover [605] and a screw [606]. The shell [601] encloses the internal components of the sound button, including batteries, electronics, PCB, speaker, and switch(es). In one aspect, the sound button may have feet [602] to minimize contact with a floor surface, to affix a substance or material that better grips a floor, to fit into an enclosure, or otherwise.

A microphone input [604] may be located on, at or near the bottom of the sound button. A switch [603], (e.g., a slide, toggle, or other switch) may be utilized to alternate between sound button functions, such as recording (with a microphone [604] or other recording facility), switching which recording is played, playback, maintenance, etc. A battery cover [605] may be affixed using a screw [606], clasp, or other conventional means of affixing the battery cover to the sound button. A recessed area [607] may be utilized to make removal of the battery cover [605] easier.

Figure 7:
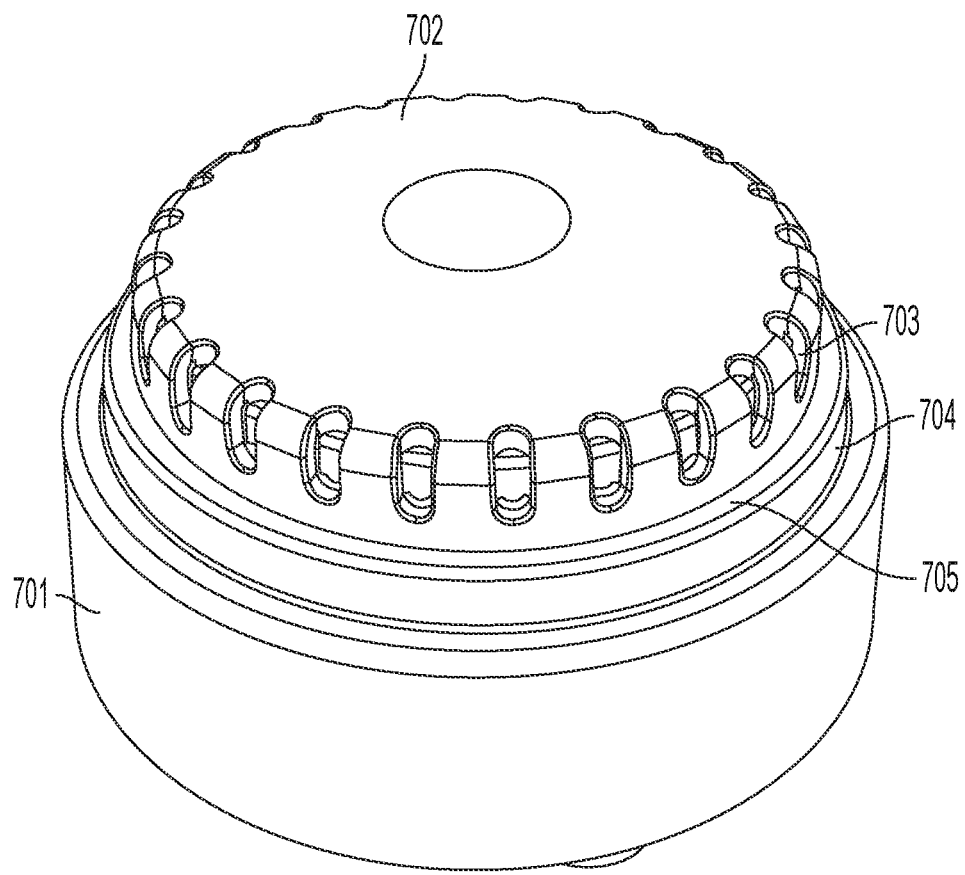
FIG. 7 is a top perspective view of a sound button.

Turning to FIG. 7, we see a top perspective view of an assembled sound button. A shell [701] encloses a power source, electronics, PCB, speaker, and switch(es). Portions of the shell may have differing circumferences, such as a reduced circumference [704] at the top. A reduced circumference may be used to keep the button cap [702] in place, may be used for style, may be used as a collection point for contaminants, or otherwise. The button cap [702] has cut-outs/recesses [703] with air space (one or more holes) to permit transmission of sound from the speaker and/or into the enclosure with fewer or no obstructions. In some aspects, the shell [701] may have a substantially vertical surface [704] with a substantially horizontal surface [705] above it. These surfaces may be utilized to capture or slow the flow of liquids or other contaminants from the top of the button.

Figure 8:
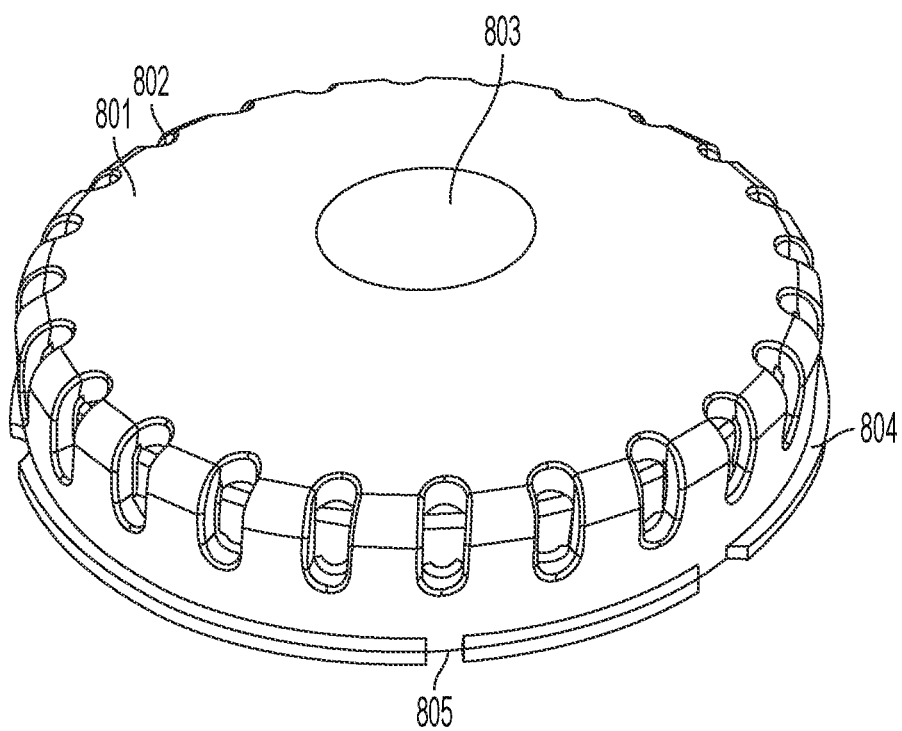
FIG. 8 is a top perspective view of a button cap.

Turning to FIG. 8, we see a button cap [801]. The button cap has recesses/cut-outs [802]. In one aspect, the button may have a circle [803] or other shape in the center on the top. The circle [803] or other shape may have embossing, a sticker, ink, drawings, or words or decorative marks within it, partially within it, or proximate to it. In one aspect, the button cap [801] may have a lip [804] at or near the bottom, which may aid in attaching/connecting and/or affixing the button cap [801] within a shell (not shown), hold the button cap [801] in place, and/or divert contaminant flow. The lip [804] may have gaps [805].

Figure 9:
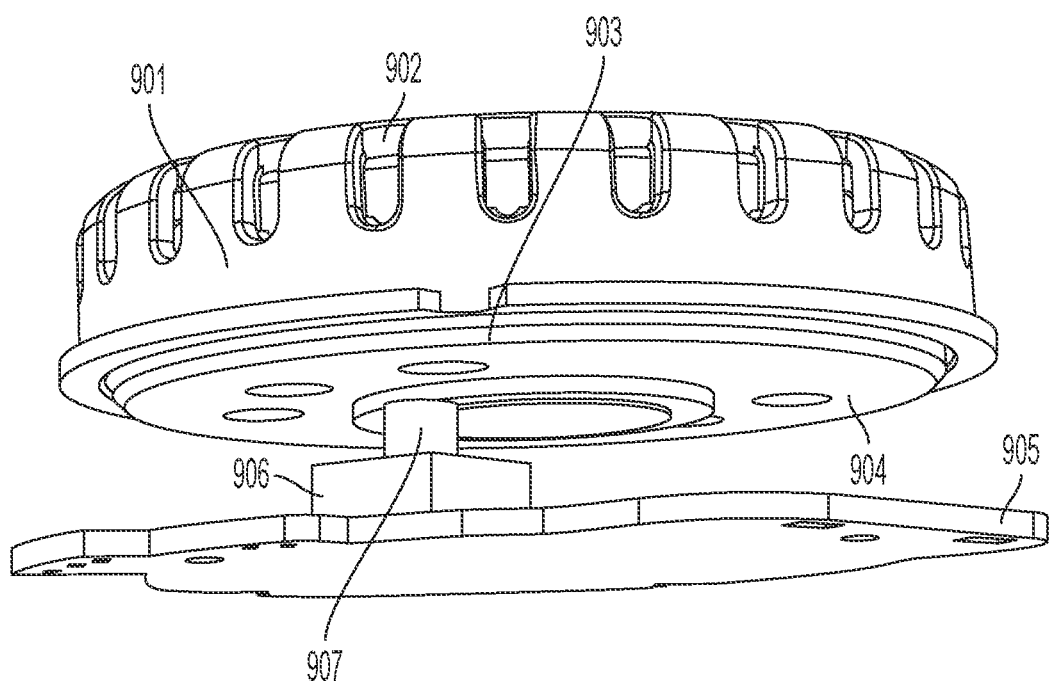
FIG. 9 is a perspective view of a button-cap, speaker, and PCB.

Turning to FIG. 9, we see a side perspective view of an exploded assembly of a PCB [905] and an unexploded assembly of a button cap [901] and speaker [903]. The button cap [901] has recesses/cut-outs [902]. The entire assembly is substantially rigid, at least sufficiently to transmit a force applied (e.g., a button press) on the top of the button cap [901] through the speaker [903], to the bottom of the speaker [904]. From that point, the pressure is transmitted to a switch [907], typically a momentary switch, which may be mounted in a switch enclosure [906]. The signal from the switch may then be transmitted to the relevant portion of the PCB [905].

Figure 10:
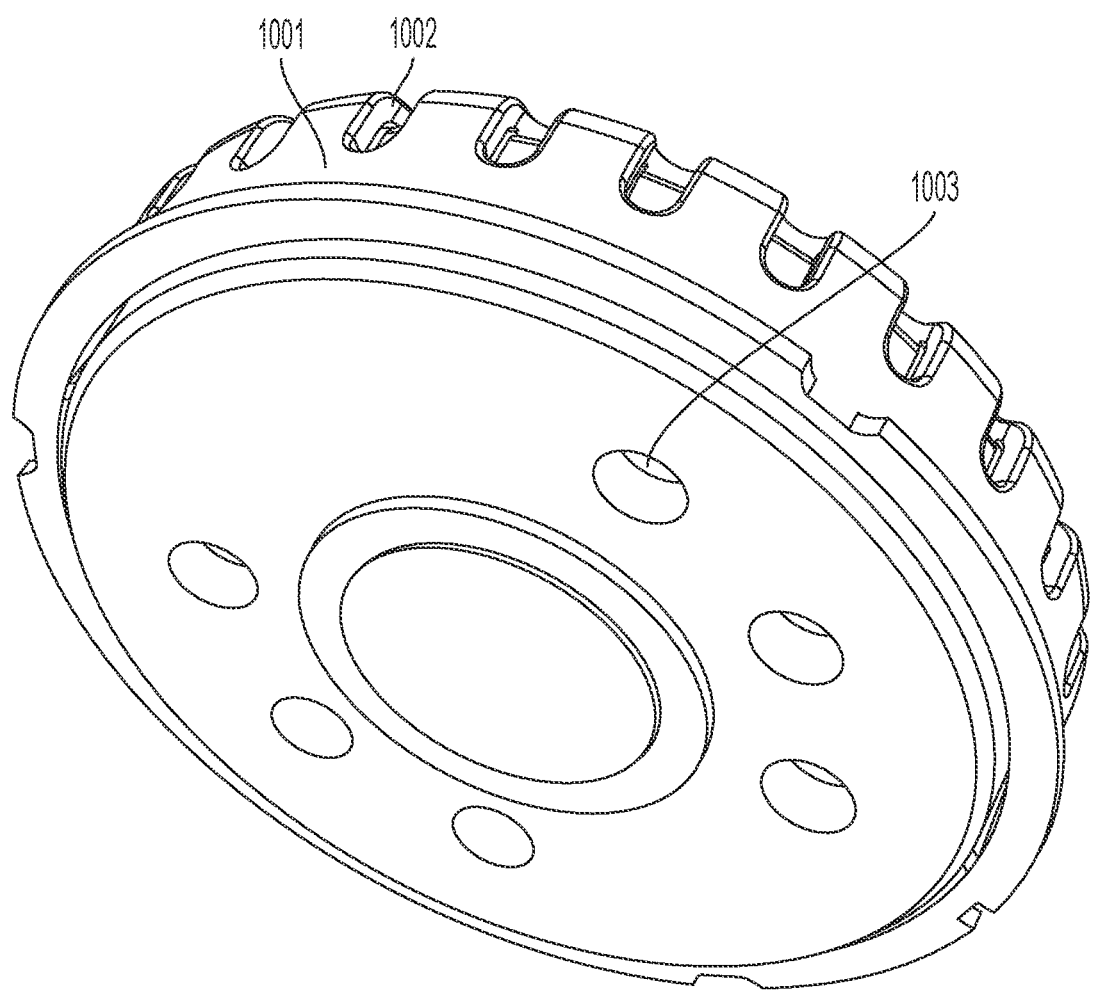
FIG. 10 is a bottom perspective view of a button cap and speaker.
Figure 11:
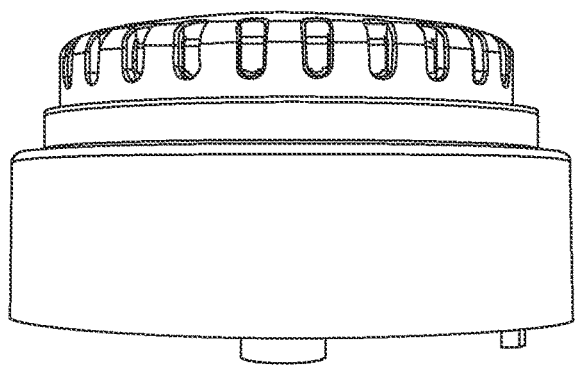
FIGS. 11-15 are side views of a sound button according to embodiments.
Figure 12:
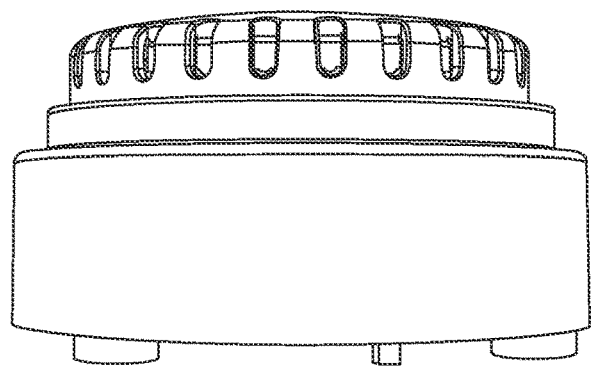
Figure 13:
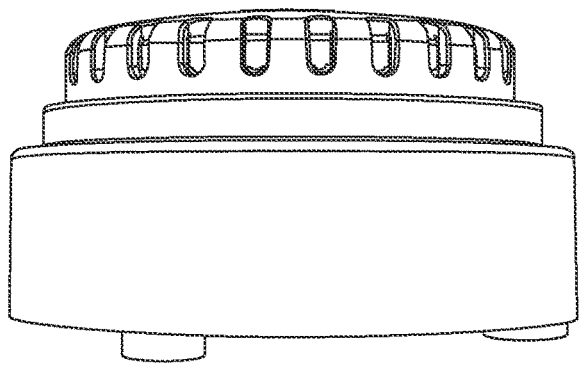
Figure 14:
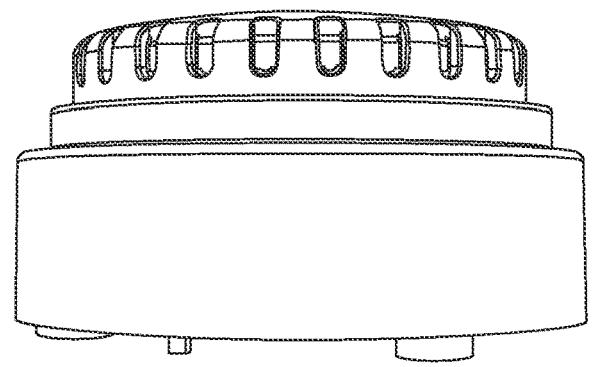
Figure 15:
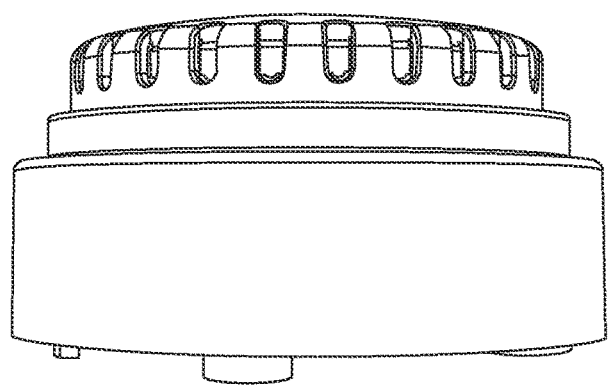

Turning to FIG. 10, we see an unexploded bottom perspective view of a button cap [1001] and speaker [1003]. Note that the button cap may have recesses/cut-outs [1002].

Figure 16:
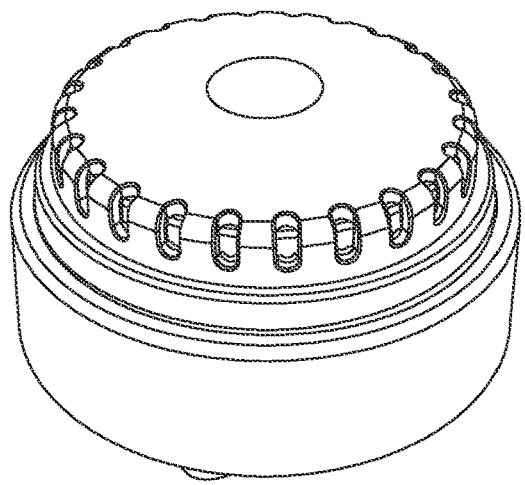
FIGS. 16-18 are top perspective views of a sound button.
Figure 17:
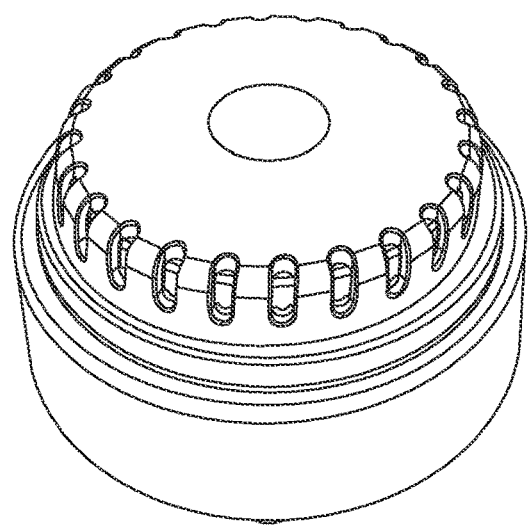
Figure 18:
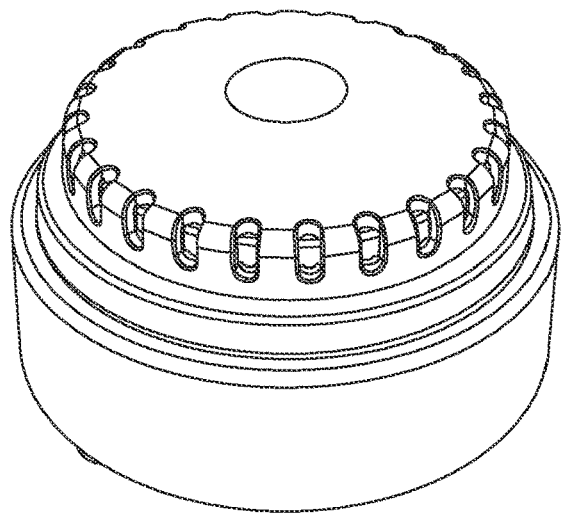

FIGS. 11-15, show side views of a fully assembled button cap from a variety of angles. FIGS. 16-18 show perspective views of a fully assembled button cap from a variety of perspectives.

Figure 19A:
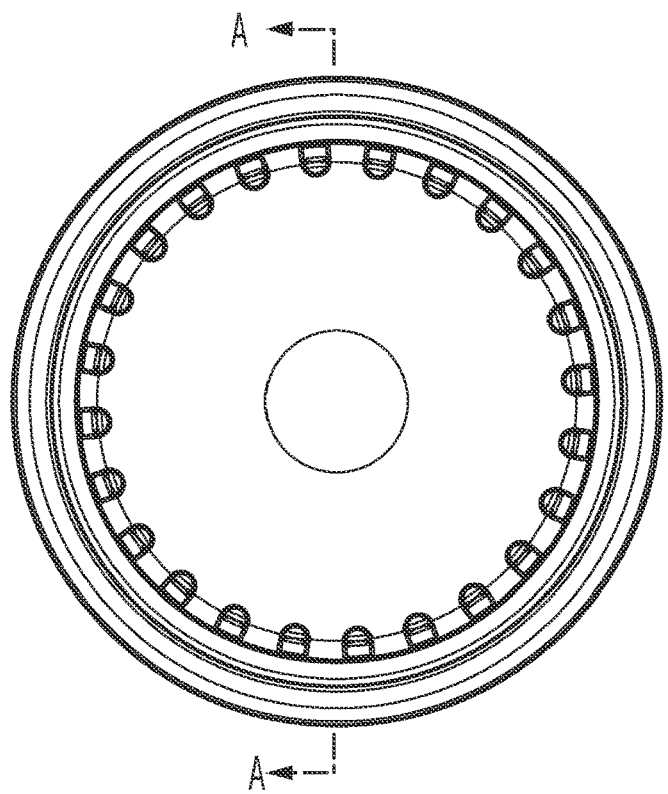
FIG. 19A is a top view of a sound button according to an embodiment.
Figure 19B:
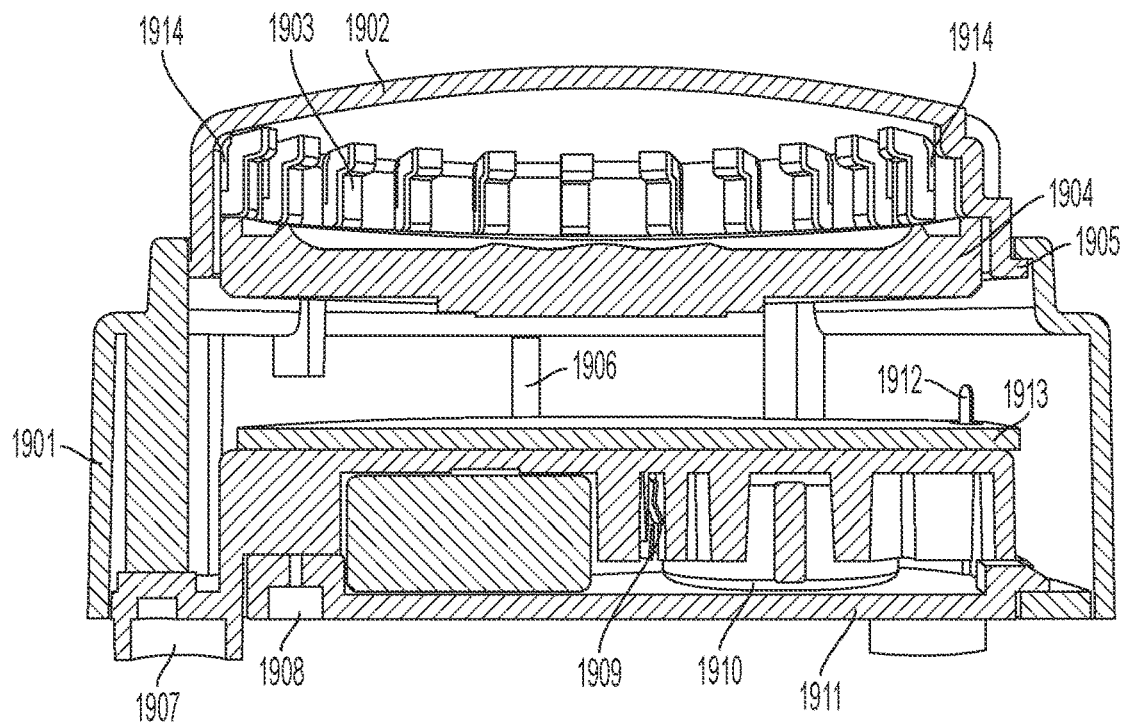
FIG. 19B is a cross-sectional view of the sound button of FIG. 19A.

Referring now to FIGS. 19A and B, we see a top view (FIG. 19A) and a cross-sectional view (FIG. 19B) of a sound button. The sound button is comprised of a shell [1901] operably coupled/connected to a button cap [1902]. As shown at the juncture of the shell [1901] and the button cap [1902], a lip [1905] may be utilized to attach, connect, hold and/or affix the button cap [1901] in place. In the embodiment in FIG. 19, the button cap [1902] has recesses/cut-outs [1903] and the recesses/cut-outs may (or, in another aspect, need not) have a clear path to the exterior of the button cap [1902] via a hole [1914]. A speaker [1904] is below the button cap [1902], in one implementation, releasing sound into an air space within the button cap [1902]. A momentary switch [1906] may be connected to a PCB [1913] and actuated by pressure transmitted from the button cap [1902] through the speaker [1904].

In one aspect, the molding of the shell [1901] (or other components affixed to the shell [1901]) may include feet [1907] and/or a compartment capable of holding feet [1907]. A screw hole [1908] may be present to permit the battery cover [1911] to be affixed. Battery clips or connectors [1909] may be present to transmit power from the batteries [1910] to the PCB and/or other components. In one aspect, pins [1912] carrying power and/or other signals may penetrate through holes in the PCB [1913].

Figure 20A:
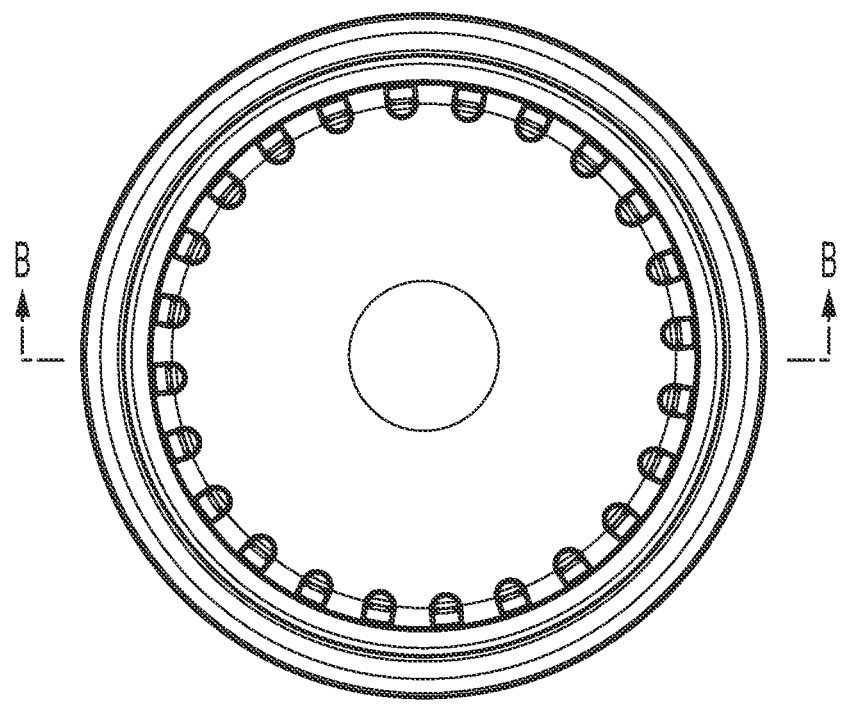
FIG. 20A is a top view of a sound button according to an embodiment.
Figure 20B:
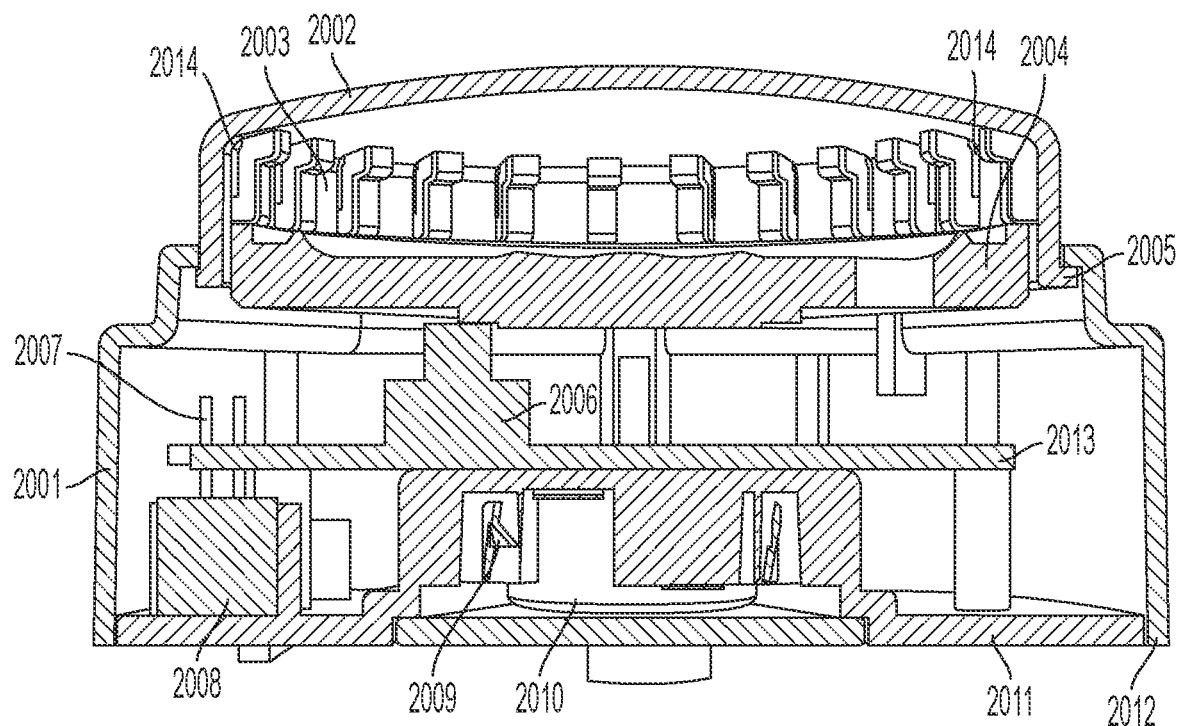
FIG. 20B is a cross-sectional view of the sound button of FIG. 20A.

Turning to FIGS. 20A and B, we see a top view (FIG. 20A) and cross-sectional view (FIG. 20B) of a sound button, comprising a shell [2001] operably connected to a button cap [2002]. As shown at the juncture of the shell [2001] and the button cap [2002], a lip [2005] may be utilized to attach, connect, hold and/or affix the button cap [2202] in place. We see that the button cap [2002] has recesses/cut-outs [2003] and that the recesses/cut-outs may (or, in another aspect, need not) have a clear path to the outside via a hole [2014]. A speaker [2004] is present below the button cap [2002], in one implementation, releasing sound into an air space within the button cap [2002]. A momentary (or other) switch [2008] may be connected to a PCB [2013] and actuated by a force transmitted from the button cap [2002] through the speaker [2004].

In one aspect, battery clips or connectors [2009] may be present to transmit power from the batteries [2010] to the PCB [2013] and/or other components. In one aspect, pins [2007] carrying power and/or other signals, such as from a switch [2008] may penetrate through holes in the PCB [2013]. In one aspect, a side wall [2012] of the shell [2001] may be substantially flush with a bottom wall [2011] of the sound button.

Figure 21A:
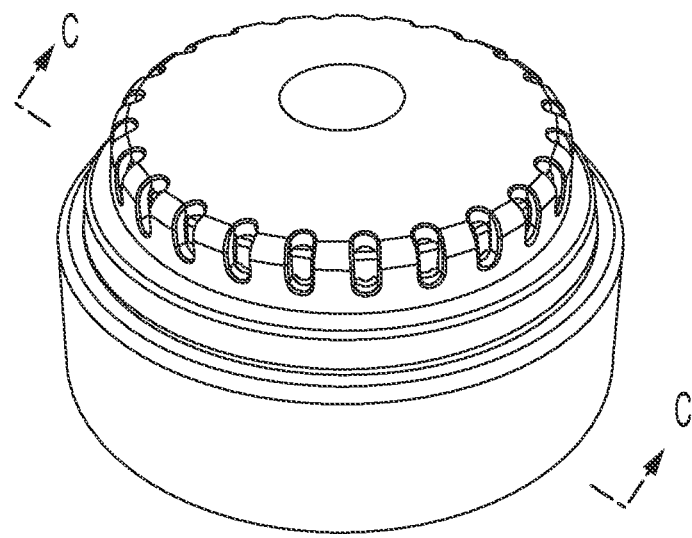
FIG. 21A is a perspective view of a sound button according to an embodiment.
Figure 21B:
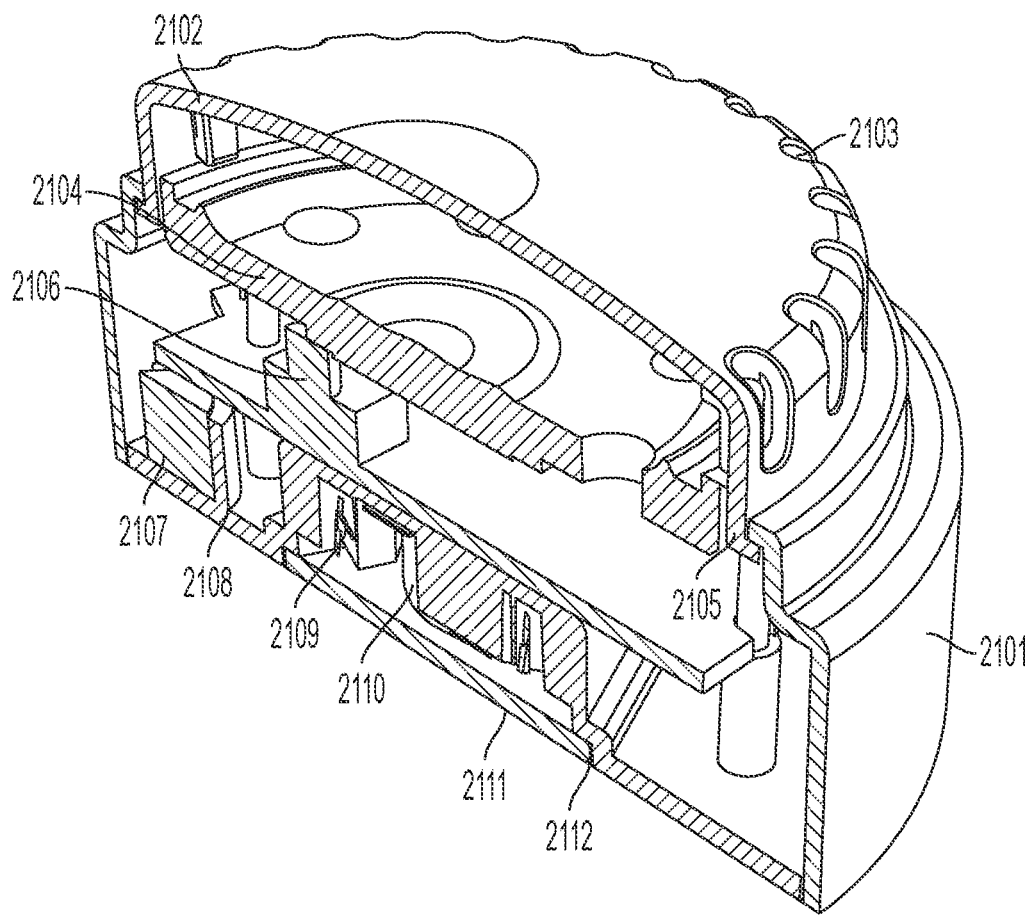
FIG. 21B cross-sectional perspective view of the sound button of FIG. 21A.

Referring now to FIGS. 21A and B, we see a perspective view (FIG. 21A) and a cross-sectional perspective view (FIG. 21B) of a sound button. The internal components are enclosed by the shell [2101]. At the top of the sound button and at least partially within the shell [2101] is the button cap [2102]. The button cap [2102] has recesses/cut-outs [2103] capable of transmitting sound from a speaker [2104] through the recesses/cut-outs [2103], permitting high quality sound transmission. When pushed and/or a forced is applied in a downward direction, the button cap [2102] contacts the speaker [2104]. The speaker, in turn, actuates a momentary (or other) switch [2106] affixed to a PBC.

The button cap [2102] and/or the shell [2101] may comprise a lip [2105] that attaches, connects, holds and/or affixes the button cap [2102] in place. A microphone [2107] may be integrated into the sound button. The bottom of the microphone [2108] may be fit to a battery cover [2111] using a lip [2112].

The batteries [2110] are enclosed at the bottom of the sound button by the battery cover [2111], which may be affixed as described above with regard to FIG. 6. The current from the batteries [2110] may be conducted with battery clips [2109].

Figure 22A:
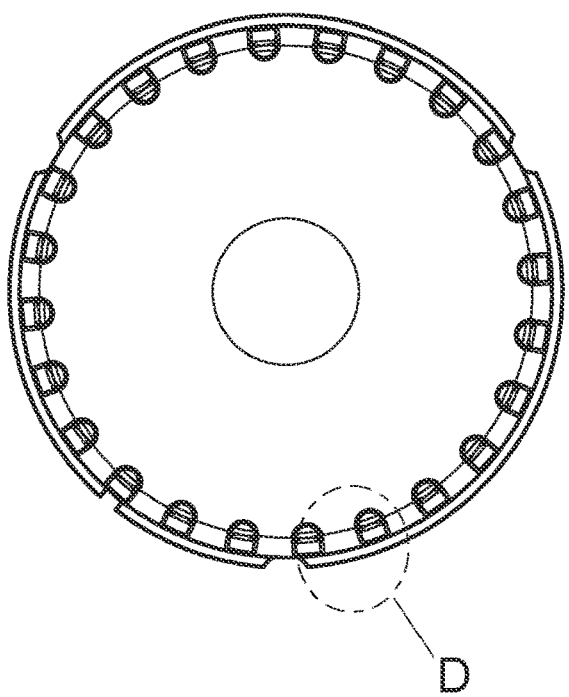
FIG. 22A is a top view of a button cap according to an embodiment.
Figure 22B:
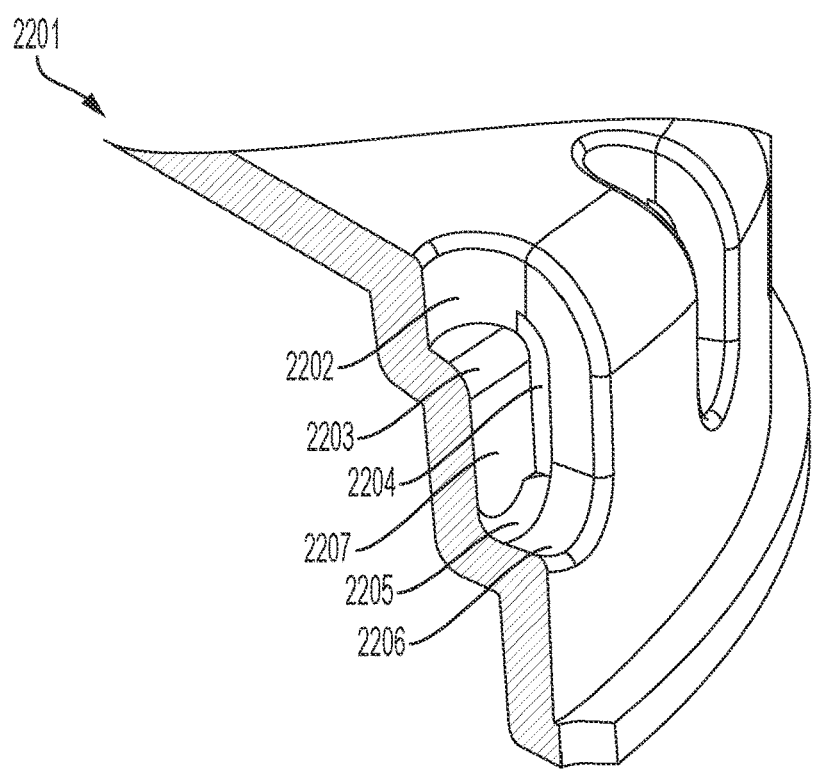
FIG. 22B is an enlarged perspective view of a portion of the button cap of FIG. 22A.

Turning to FIGS. 22A and B, we see a top view of a button cap (FIG. 22A) and an enlarged perspective view (FIG. 22B) of a portion of the button cap [2201]. In one aspect, the recess/cut-out (see e.g., recess/cutout [703] of FIG. 7) may have a vertical wall [2202] at or near the top, a horizontal and/or a curved wall [2203], a second vertical wall [2207], a curved component [2205] and an bottom structure [2206] that, in combination, allow fluids or other contaminants to roll and/or travel down the button cap and/or sound button without (or with minimal) intrusion into a hole [2204] (e.g., typically a substantially vertical slot) that transmits sound between the inside and outside (and/or, in the case of an internal microphone, from the outside to the inside) of the sound button.

Figure 23A:
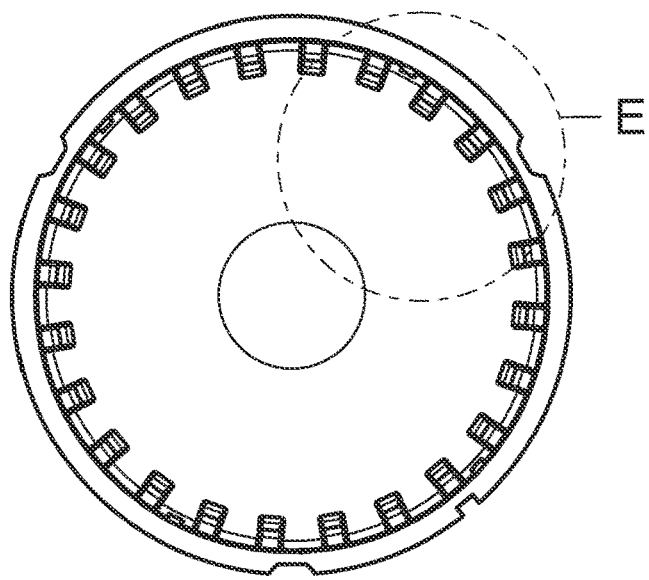
FIG. 23A is a bottom (interior) view of a button cap according to an embodiment.
Figure 23B:
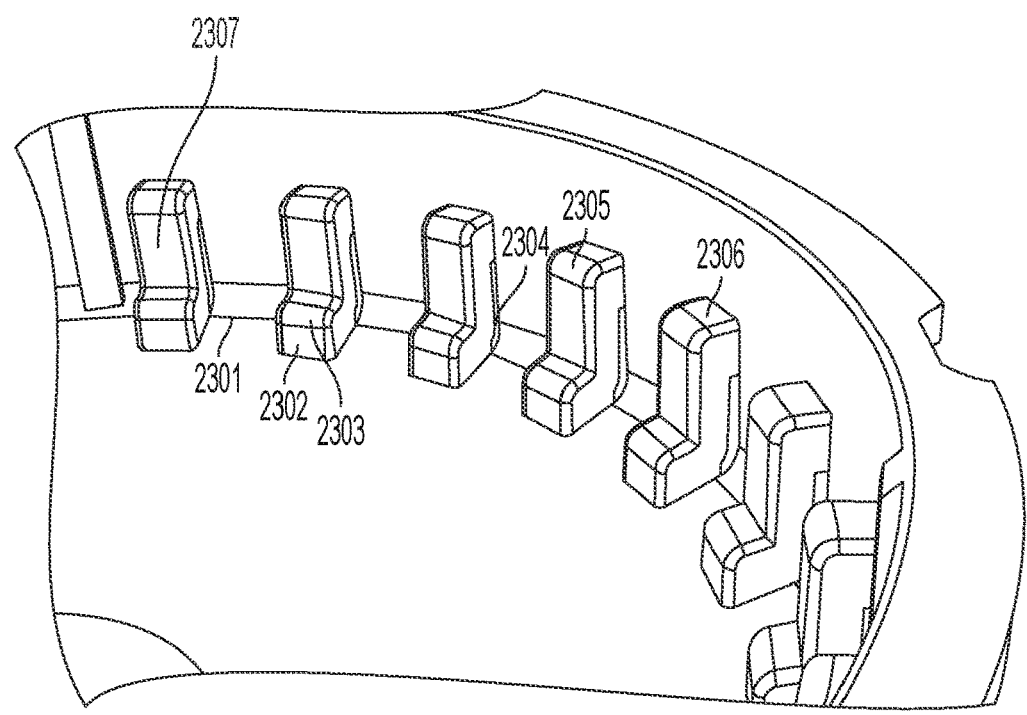
FIG. 23B is an enlarged inverted interior perspective view of a portion of the button cap of FIG. 23A.

Turning to FIGS. 23A and B, we see a bottom (interior) view of a button cap (FIG. 23A) and an enlarged inverted, interior perspective view (FIG. 23B) of a portion of the button cap. In one aspect, the button cap may be circular when viewed from the top with a curved surface [2301] in between the recesses/cut-outs (see e.g., recesses/cutouts [703] of FIG. 7) located at or near the perimeter of the button cap. The recesses/cut-outs may have a vertical surface [2302] that may transition to a curved and/or horizontal surface [2303], which in turn may transition to a vertical surface [2307]. The recesses/cut-outs may have a hole [2304] for transmission of sound into and/or out of the button. The bottom of the recesses/cut-outs may be comprised of a curved surface [2305] connected to a horizontal surface [2306]. Alternatively, the vertical surface [2307] may directly connect to the horizontal surface [2306].

Figure 24A:
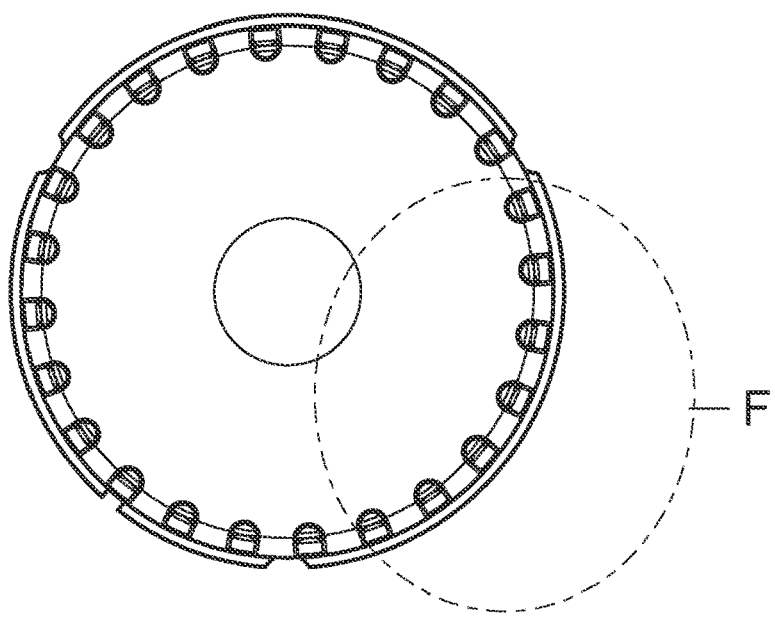
FIG. 24A is a top (exterior) view of a button cap according to an embodiment.
Figure 24B:
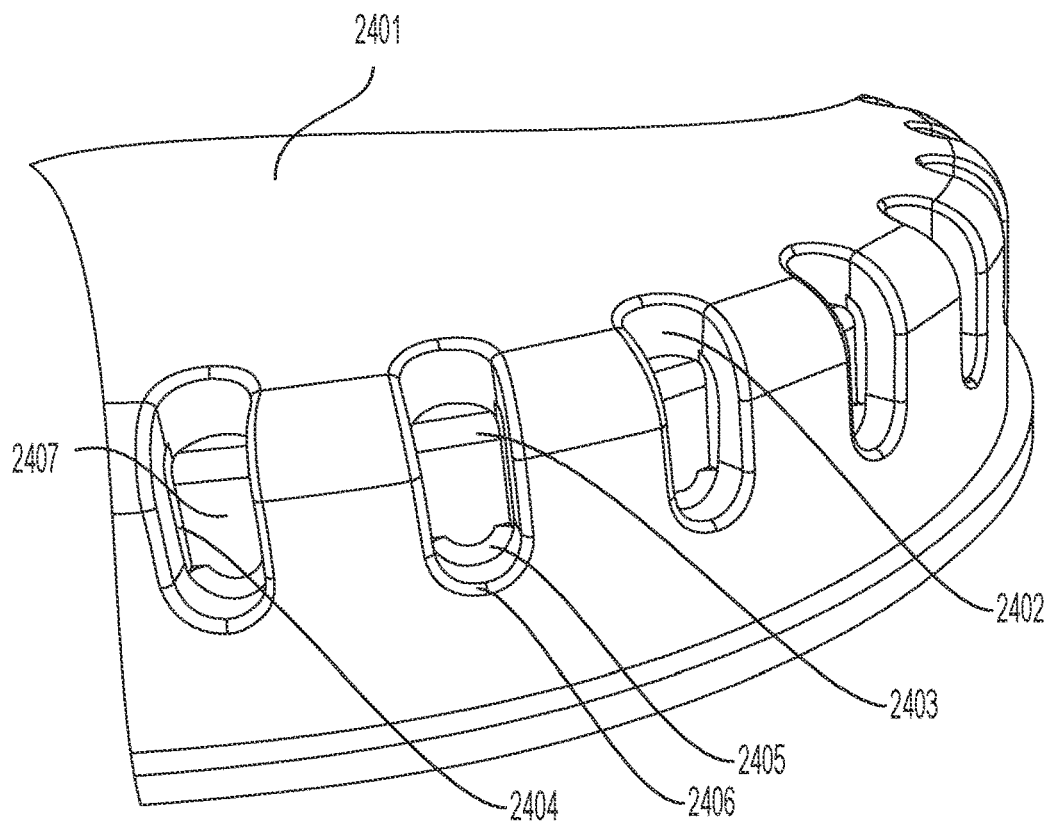
FIG. 24B is an enlarged exterior perspective view of a portion of the button cap of FIG. 24A.

In FIGS. 24A and B is shown a top (exterior) view of a button cap (FIG. 24A) and an enlarged exterior perspective view (FIG. 24B) of a portion of the button cap [2401]. Each of the recesses/cut-outs (see e.g., recesses/cutouts [703] of FIG. 7) may have a substantially vertical surface [2402] connected to a horizontal and/or curved surface [2403]. A hole [2404] (typically a substantially vertical slot) is located adjacent to a side of each of the recesses/cut-outs. The bottom of each recess/cut-out may have a curved surface [2405] or may transition directly to a substantially horizontal surface [2406]. Alternatively, the recesses/cut-outs may transition directly to a substantially vertical surface. A substantially vertical surface [2407] may connect the horizontal and/or curved surface [2403] to the curved surface [2405] and/or the horizontal surface [2406].

Figure 25A:
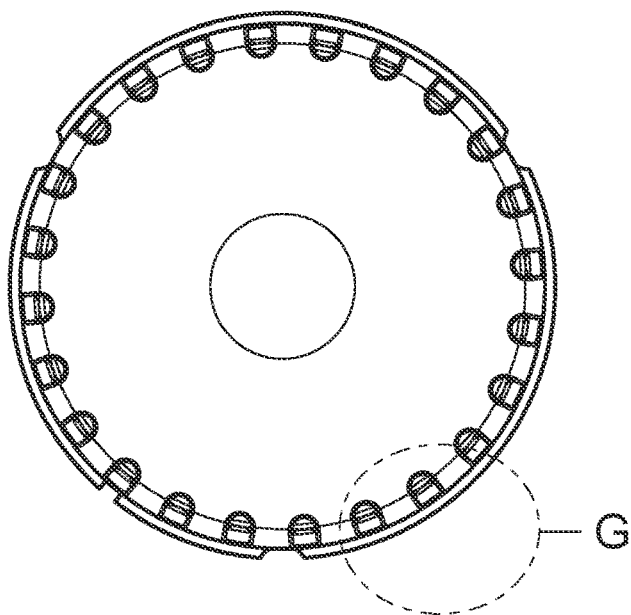
FIG. 25A is a top view of a button cap according to and embodiment.
Figure 25B:
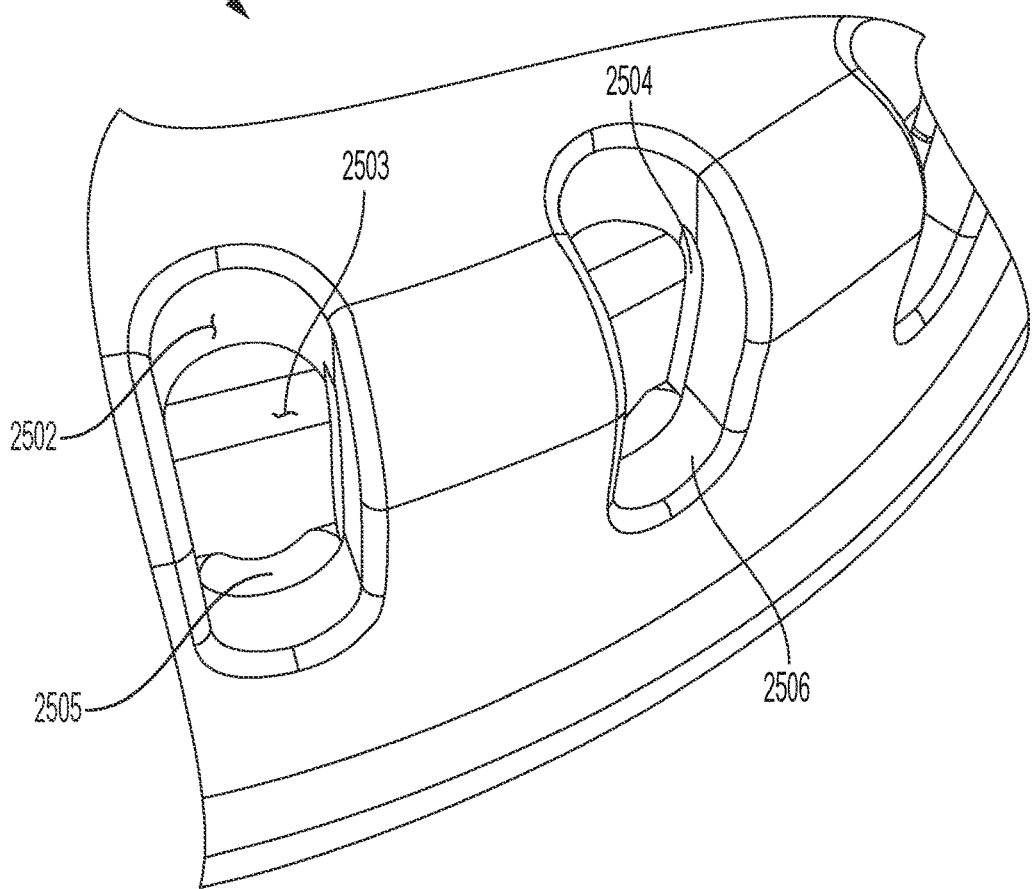
FIG. 25B is an enlarged perspective view of a portion of the exterior of the button cap of FIG. 25A.

Turning to FIGS. 25A and B, therein is shown a top view (FIG. 25A) and an enlarged perspective view (FIG. 25B) of the exterior of a button cap with recesses/cut-outs [2501] Each cut-out may have a vertical surface [2502] connected to a horizontal and/or curved surface [2503]. A hole [2504] is located adjacent to a side of the cut-out. The bottom of the cut-out may have a curved surface [2505] or may transition directly to a horizontal surface [2506].

Figure 26:
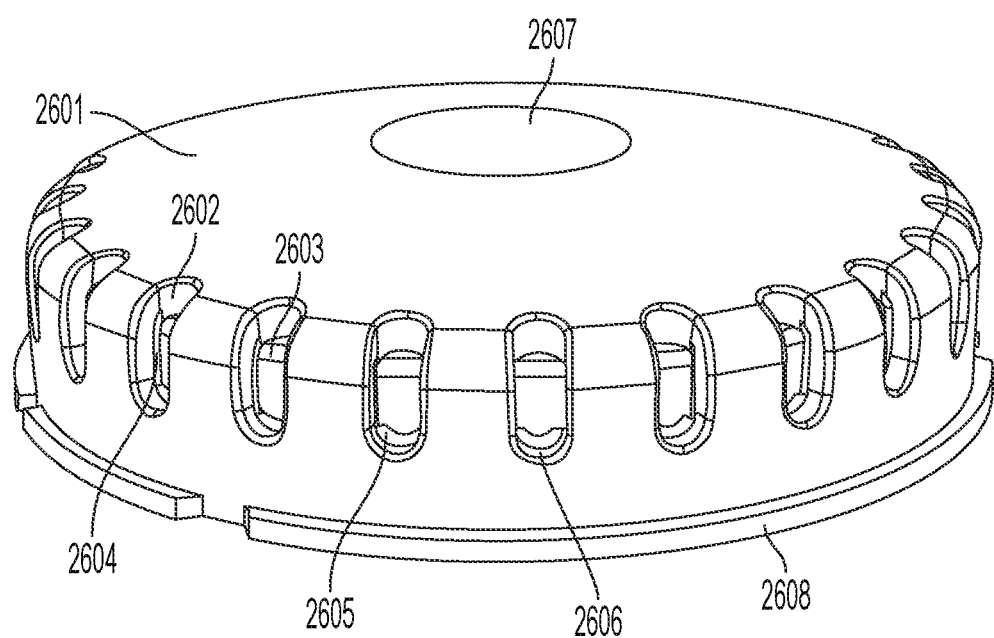
FIG. 26 is a perspective view of a button cap.

Turning to FIG. 26, we have a perspective view of a button cap [2601]. Each recess/cut-out may have a vertical surface [2602] connected to a horizontal and/or curved surface [2603]. A hole [2604] is located adjacent to a side of the cut-out. The bottom of the cut-out may have a curved surface [2605] or may transition directly to a horizontal surface [2606]. A circle [2607] may be present on top of the cap. The circle [2607] may be ornamental, need not be a circle but may be another shape, and may have markings, words, or images. The bottom of the button cap may have a lip [2608].

Figure 27:
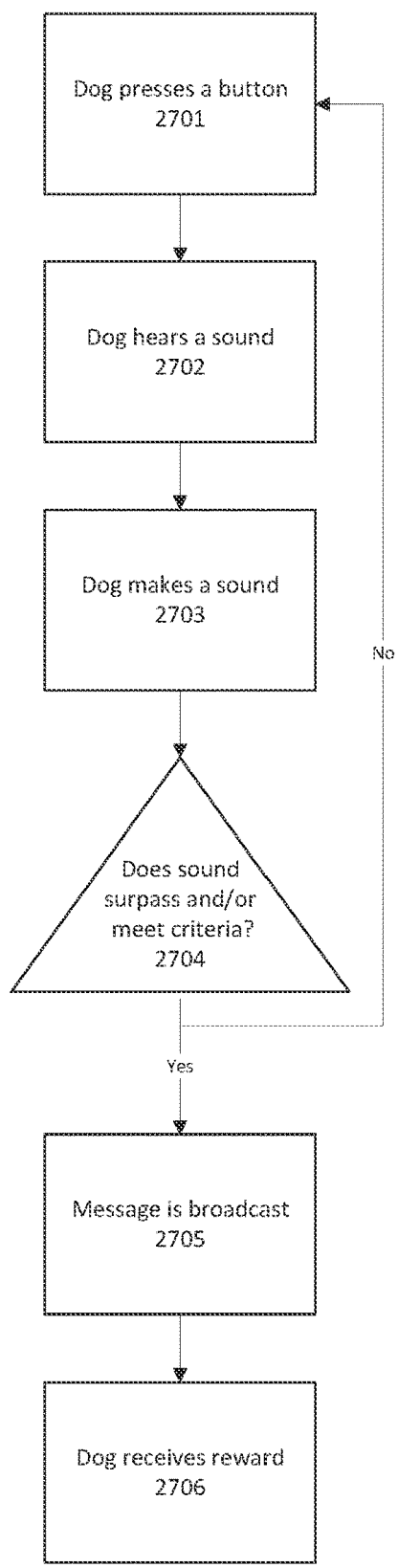
FIG. 27 is a flow chart diagram of a method for training an animal according to an embodiment.

Turning to FIG. 27, therein is shown an exemplary flow chart of a method for training an animal (e.g., a dog). The dog may press a button [2701]. The press triggers a sound that the dog hears [2702]. The dog makes a sound (or motion) in response (a confirmative action or rejection action) [2703]. At step [2704], if the sound meets and/or exceeds certain criteria, at step [2705], the message is broadcast, and the dog is optionally rewarded [2706]. If, at step [2704], the criteria are not met/exceeded, the sequence may restart at step [2701].

In one aspect, a sensor or set of sensors may be utilized to determine when an environmental element is actuated or action is taken, preferably where the element or action corresponds to a button. For example, going outside is a desirable request to be correlated with a button press. By placing a sensor on the door that determines it has been opened, the system could make the "go out" button emit a sound and/or light up and/or otherwise be noticeably actuated in some manner when the door opens. In one aspect, the sensor may be manually actuated or manually disengaged in conjunction with opening the door. Another analogy would be a button for "water bowl". When the dog drinks from the water bowl, the button may be actuated and say "water".

When the bowl is empty, the dog would press the button to alert the humans to the need for more water.

By actuating the button when an event takes place, such as a door open or a water bowl being used, the dog will come to associate the button with the element or action. This allows the dog to be passively trained, in whole or part, as to what thing each (or at least one) button does.

In one aspect, computer vision may be utilized to identify what the dog is looking at and, in one aspect, play a sound associated with the thing (such as the name of the thing). In another aspect, an EEG may be used to determine whether the animal is surprised.

In another aspect, the mode of pressing the button may alternate the response of the button. For example, if the front left paw presses button A, it will say "go to backyard". With the right paw, it will say "go for a walk". Pressure, cadence and other characteristics of the button presses may be utilized for this purpose.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A sound button, comprising:
a shell;
a switch operably connected to a printed circuit board ("PCB");
a button cap assembly operably coupled to the shell, the button cap assembly comprising:
  a button cap having at least one recess, the at least one recess having a hole; and
  a speaker facing toward the button cap;
where, when a force is applied to the button cap, the button cap and the speaker move together to actuate the switch, thereby causing the speaker to emit a sound.

2. The sound button of claim 1, where the hole is displaced from a location of the speaker.

3. The sound button of claim 1, where the hole comprises a valve.

4. The sound button of claim 3, where the valve is operated by air displacement.

5. The sound button of claim 3, where the valve is mechanically opened when the switch is activated.

6. The sound button of claim 1, where the hole is a substantially vertical slot that transmits sound.

7. The sound button of claim 1, where the at least one recess is a plurality of recesses.

8. The sound button of claim 7, where the each of the plurality of recesses has a vertical wall, a horizontal or curved wall, a second vertical wall, a curved component and a bottom structure that, in combination, allow fluids or other contaminants to travel down the button cap without, or with minimal intrusion, into the hole.

9. A sound button, comprising:
a shell having a portion with a reduced circumference;
a switch operably connected to a printed circuit board ("PCB");
a button cap assembly operably connected to the shell, the button cap assembly comprising:
  a button cap having at least one recess, the at least one recess having a hole; and
  a speaker facing toward the button cap;
where, when a force is applied to the button cap, the button cap and the speaker move together to actuate the switch, thereby causing the speaker to emit a sound; and
where the hole transmits the sound.

10. The sound button of claim 9, where the portion with the reduced circumference retains the button cap within the shell.

11. The sound button of claim 9, where the reduced circumference collects contaminants.

12. The sound button of claim 9, where the hole is a vertical slot.

13. The sound button of claim 9, where the shell has a substantially vertical surface and a substantially horizontal surface that capture or slow a flow of liquids or other contaminants from the top of the button.

14. A sound button, comprising:
a shell having a substantially vertical surface and a substantially horizontal surface;
a switch operably connected to a printed circuit board ("PCB");
a button cap assembly operably connected to the shell, the button cap assembly comprising:
  a button cap having at least one recess and a hole; and
  a speaker facing an air space in the button cap;
where, when a force is applied to the button cap, the button cap and the speaker move together to actuate the switch, thereby causing the speaker to emit a sound; and
where the substantially vertical surface and the substantially horizontal surface capture or slow a flow of contaminants from the top of the button.

15. The sound button of claim 14, where the hole transmits sound from the speaker.

16. The sound button of claim 14, where the hole is a vertical slot.

17. The sound button of claim 14, where the shell has a portion with a reduced circumference.

18. The sound button of claim 17, where the reduced circumference collects contaminants.

19. The sound button of claim 17, where the reduced circumference retains the button cap within the shell.

20. The sound button of claim 17, where the at least one recess is a plurality of recesses.

* * * * *